(12) United States Patent
Takano et al.

(10) Patent No.: US 12,520,120 B2
(45) Date of Patent: Jan. 6, 2026

(54) COMMUNICATION SYSTEM FOR DETECTING AND RECOVERING FROM A FAILURE OCCURING IN A CORE NETWORK

(71) Applicant: SONY GROUP CORPORATION, Tokyo (JP)

(72) Inventors: Hiroaki Takano, Tokyo (JP); Hirofumi Kasai, Tokyo (JP); Tomoaki Matsumura, Tokyo (JP); Hiroto Kuriki, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 278 days.

(21) Appl. No.: 18/041,013

(22) PCT Filed: Jul. 2, 2021

(86) PCT No.: PCT/JP2021/025180
§ 371 (c)(1),
(2) Date: Feb. 8, 2023

(87) PCT Pub. No.: WO2022/044546
PCT Pub. Date: Mar. 3, 2022

(65) Prior Publication Data
US 2023/0319542 A1 Oct. 5, 2023

(30) Foreign Application Priority Data
Aug. 27, 2020 (JP) .................................. 2020-143533

(51) Int. Cl.
*H04W 8/18* (2009.01)
*H04L 43/0817* (2022.01)
(Continued)

(52) U.S. Cl.
CPC ......... *H04W 8/183* (2013.01); *H04L 43/0817* (2013.01); *H04W 24/08* (2013.01); *H04W 76/19* (2018.02)

(58) Field of Classification Search
CPC . H04W 8/183; H04W 76/19; H04W 43/0817; H04W 24/08; H04W 12/12;
(Continued)

(56) References Cited

U.S. PATENT DOCUMENTS

2012/0236708 A1   9/2012  Kompella
2015/0163090 A1*  6/2015  Tsubouchi .......... H04L 41/0659
                                              370/218
(Continued)

FOREIGN PATENT DOCUMENTS

EP    3136818 A1 *  3/2017  ........ H04W 36/0072
JP    2014-236234 A  12/2014
JP    2015-115774 A   6/2015

OTHER PUBLICATIONS

"Study on control and user plane separation of EPC nodes" Jun. 2016 (Year: 2016).*
(Continued)

*Primary Examiner* — Mewale A Ambaye
(74) *Attorney, Agent, or Firm* — CHIP LAW GROUP

(57) ABSTRACT

To detect and recover from failure occurring in a core network.
A subscriber information holding unit holds subscriber information indicating association between a terminal and a user plane function in a communication system. A failure detection unit detects a failure related to the user plane function. A control unit changes the subscriber information held in the subscriber information holding unit so as to associate a new user plane function with the terminal
(Continued)

associated with the user plane function in which the failure is detected by the failure detection unit.

14 Claims, 20 Drawing Sheets

(51) Int. Cl.
  *H04W 24/08* (2009.01)
  *H04W 76/19* (2018.01)
(58) Field of Classification Search
  CPC . H04W 36/0033; H04W 16/18; H04W 76/22; H04W 24/04; H04W 8/30; H04L 67/535
  See application file for complete search history.

(56) References Cited

U.S. PATENT DOCUMENTS

| | | | |
|---|---|---|---|
| 2018/0041942 A1 | 2/2018 | Raman | |
| 2020/0228605 A1 | 7/2020 | Dodd-Noble | |
| 2022/0312465 A1* | 9/2022 | He | H04L 5/0092 |
| 2023/0070702 A1* | 3/2023 | Lei | H04L 65/1063 |
| 2023/0156091 A1* | 5/2023 | Poscic | H04L 67/141 |
| | | | 370/254 |
| 2023/0247066 A1* | 8/2023 | Nayak | H04L 65/1073 |
| | | | 709/227 |
| 2024/0048981 A1* | 2/2024 | Kim | H04W 12/037 |
| 2024/0097778 A1* | 3/2024 | Han | H04B 7/18517 |

OTHER PUBLICATIONS

3rd Generation Partnership Project; Technical Specification Group Services and System Aspects; Study on control and user plane Separation of EPC nodes (Release 14), 3GPP Standard ; Technical Report ; 3GPP TR 23.714, 3rd Generation Partnership Project (3GPP) ,Jun. 22, 2016 (Jun. 22, 2016), pp. 1-87, vol. SA WG2, No. V14.0.0, XP051295181.

Huawei et al: "Resource management of UPF shared by multiple SMFs",3GPP Draft; S2-183458 PCR_Resource Management of UPF Shared By Multiple Smfs Düring UPF Relocation R1.0, 3rd Generation Partnership Project (3GPP), Apr. 16, 2018-Apr. 20, 2018 Apr. 10, 2018 (Apr. 10, 2018),vol. SA WG2, XP051437776.

International Search Report and Written Opinion of PCT Application No. PCT/JP2021/025180, issued on Sep. 28, 2021, 09 pages of ISRWO.

"Telecommunication management; Fault Management (FM) for mobile networks that include virtualized network functions; Procedures", 3rd Generation Partnership Project (3GPP), Technical specification 28.516, Section 4.1, 2022.

* cited by examiner

FIG. 7

| UPF IDENTIFIER | ARRANGEMENT POSITION | STATE | PROCESSING USAGE RATE |
|---|---|---|---|
| 1 | LAN | IN OPERATION | 0.5 |
| 2 | LAN | IN OPERATION | 0.9 |
| 3 | CLOUD | | |
| ⋮ | ⋮ | ⋮ | ⋮ |
| 30 | CLOUD | IN OPERATION | 0.1 |
| 31 | CLOUD | IN STOPPAGE | 0.0 |
| 32 | CLOUD | IN OPERATION | 0.6 |

FIG. 8

| UPF IDENTIFIER | ARRANGEMENT POSITION | STATE | NUMBER OF TERMINALS ACCOMMODATED |
|---|---|---|---|
| 1 | LAN | IN OPERATION | 10 |
| 2 | LAN | IN OPERATION | 1 |
| 3 | CLOUD | | |
| ⋮ | ⋮ | ⋮ | ⋮ |
| 30 | CLOUD | IN OPERATION | 5 |
| 31 | CLOUD | IN STOPPAGE | 0 |
| 32 | CLOUD | IN OPERATION | 33 |

FIG. 10

| UPF IDENTIFIER | ARRANGEMENT POSITION | STATE | PROCESSING USAGE RATE | NUMBER OF TERMINALS ACCOMMODATED | IDENTIFIERS OF TERMINALS ACCOMMODATED |
|---|---|---|---|---|---|
| 1 | LAN | IN OPERATION | 0.5 | 2 | |
| 2 | LAN | IN OPERATION | 0.9 | 3 | |
| 3 | CLOUD | | | | |
| ⋮ | ⋮ | ⋮ | ⋮ | ⋮ | ⋮ |
| 30 | CLOUD | IN FAILURE | 0.9 (IMMEDIATELY BEFORE OCCURRENCE OF FAILURE) | 9 (IMMEDIATELY BEFORE OCCURRENCE OF FAILURE) | |
| 31 | CLOUD | IN STOPPAGE | 0.0 | 0 | — |
| 32 | CLOUD | IN OPERATION | 0.6 | 5 | |

FIG. 12

| UPF IDENTIFIER | ARRANGEMENT POSITION | STATE | PROCESSING USAGE RATE | PERMIT TRANSFER FROM LAN TO CLOUD UPON OCCURRENCE OF FAILURE |
|---|---|---|---|---|
| 1 | LAN | IN OPERATION | 0.5 | DO NOT PERMIT |
| 2 | LAN | IN OPERATION | 0.9 | PERMIT |
| 3 | CLOUD | | | — |
| ⋮ | ⋮ | ⋮ | ⋮ | ⋮ |
| 30 | CLOUD | IN FAILURE | 0.9 (IMMEDIATELY BEFORE OCCURRENCE OF FAILURE) | — |
| 31 | CLOUD | IN STOPPAGE | 0.0 | — |
| 32 | CLOUD | IN OPERATION | 0.6 | — |

FIG. 15

| UPF IDENTIFIER | ARRANGEMENT POSITION | STATE | PROCESSING USAGE RATE | PERFORMANCE OF COMPUTER ACCOMMODATING UPF |
|---|---|---|---|---|
| 1 | LAN | IN OPERATION | 0.5 | HIGH |
| 2 | LAN | IN OPERATION | 0.9 | HIGH |
| 3 | CLOUD | | | – |
| ⋮ | ⋮ | ⋮ | ⋮ | ⋮ |
| 30 | CLOUD | IN FAILURE | 0.9 (IMMEDIATELY BEFORE OCCURRENCE OF FAILURE) | LOW |
| 31 | CLOUD | IN STOPPAGE | 0.0 | LOW |
| 32 | CLOUD | IN OPERATION | 0.6 | HIGH |

FIG. 16

| UPF IDENTIFIER | ARRANGEMENT POSITION | STATE | PROCESSING USAGE RATE | RECOVERY PRIORITY |
|---|---|---|---|---|
| 1 | LAN | IN OPERATION | 0.5 | HIGH |
| 2 | LAN | IN OPERATION | 0.9 | HIGH |
| 3 | CLOUD | | | MIDDLE |
| ⋮ | ⋮ | ⋮ | ⋮ | ⋮ |
| 30 | CLOUD | IN OPERATION | 0.1 | LOW |
| 31 | CLOUD | IN STOPPAGE | 0.0 | MIDDLE |
| 32 | CLOUD | IN OPERATION | 0.6 | HIGH |

COMMUNICATION SYSTEM FOR DETECTING AND RECOVERING FROM A FAILURE OCCURING IN A CORE NETWORK

CROSS REFERENCE TO RELATED APPLICATIONS

This application is a U.S. National Phase of International Patent Application No. PCT/JP2021/025180 filed on Jul. 2, 2021, which claims priority benefit of Japanese Patent Application No. JP 2020-143533 filed in the Japan Patent Office on Aug. 27, 2020. Each of the above-referenced applications is hereby incorporated herein by reference in its entirety.

TECHNICAL FIELD

The present technology relates to a communication system. Specifically, the present technology relates to a communication system that recovers a failure in a core network and a failure recovery method thereof.

BACKGROUND ART

The cellular network includes a radio access network (RAN) and a core network (CN). The RAN is a radio system between a base station (BS) and a terminal (UE: User Equipment). The core network mainly performs permission and session management when the terminal connects to the network. In 4G and 5G, the core network includes a control plane function (CPF) and a user plane function (UPF). In a case where a terminal is connected to a network to transmit and receive data, a function of a user plane of a core network is required. In the case of 4G, SGW and PGW play this role. In the case of 5G, the user plane function plays this role.

A plurality of user plane function resources is arranged in the core network. In a case where the function of a user plane function cannot be used due to a failure, it is necessary to detect and recover the failure. Network Functions Virtualization (NFV) discloses an architecture for forwarding an alarm (see, for example, Non-Patent Document 1).

CITATION LIST

Non-Patent Document

Non-Patent Document 1: 3GPP TS28.516, Section 4.1

SUMMARY OF THE INVENTION

Problems to be Solved by the Invention

Meanwhile, since the user plane function can be arranged not only in the cloud but also in the local area network, a failure recovery mechanism becomes complicated. In the above-described prior art, such complexity of the network is not considered, and there is a possibility that failure recovery cannot be handled well.

The present technology has been made in view of such a situation, and an object thereof is to detect and recover from failure occurring in a core network.

Solutions to Problems

The present technology has been made to solve the above-described problems, and a first aspect thereof is a communication system including: a subscriber information holding unit that holds subscriber information indicating association between a terminal and a user plane function in a communication system; a failure detection unit that detects a failure related to the user plane function; and a control unit that changes the subscriber information to associate a new user plane function with the terminal associated with the user plane function in which the failure is detected, and a failure recovery method thereof. Therefore, an effect of changing the association between the terminal and the user plane function at the time of failure detection is obtained.

Furthermore, in the first aspect, the control unit may select, as the new user plane function, a user plane function with a low processing usage rate among user plane functions in operation. Therefore, an effect that a user plane function having a low processing usage rate is newly associated with the terminal is obtained. In this case, the processing usage rate may be determined on the basis of the traffic amount of the user plane function in operation. Furthermore, the processing usage rate may be determined on the basis of the number of terminals associated with the user plane function in operation.

Furthermore, in the first aspect, in a case where the user plane function in which the failure is detected is arranged in a cloud, the control unit may select another user plane function in operation arranged in the cloud as the new user plane function, and in a case where the user plane function in which the failure is detected is arranged in a local area network, the control unit may select another user plane function in operation arranged in the local area network as the new user plane function. Therefore, an effect of associating a new user plane function with the terminal without significantly changing the arrangement of the user plane functions is obtained.

Furthermore, in the first aspect, in a case where the user plane function in which the failure is detected is arranged in the local area network, if there is no user plane function that satisfies a predetermined criterion among other user plane functions in operation arranged in the local area network, the control unit may select another user plane function in operation arranged in the cloud as the new user plane function. In this case, the control unit may manage, for each user plane function, permission information as to whether or not to permit selection of another user plane function in operation arranged in the cloud as the new user plane function in a case where the user plane function in which the failure is detected is arranged in the local area network, and select another user plane function in operation arranged in the cloud as the new user plane function only in a case where the permission information of the user plane function in which the failure is detected indicates permission.

Furthermore, in the first aspect, the control unit may associate a plurality of the new user plane functions with the terminal associated with the user plane function in which the failure is detected. Therefore, an effect of distributing the traffic of the user plane function is obtained.

Furthermore, in the first aspect, the control unit may manage, as computer performance information, performance of a computer storing a user plane function in operation for each user plane function, and select the new user plane function on the basis of the computer performance information. Therefore, an effect of transferring to a user plane function having equivalent performance is obtained.

Furthermore, in the first aspect, the control unit may manage priority information of user plane functions in operation for each user plane function, and select the new user plane function on the basis of the priority information. Therefore, an effect of preferentially transferring the user plane function that needs to be recovered quickly is obtained.

Furthermore, in the first aspect, the failure detection unit may be arranged in both a cloud and a local area network. In this case, the failure detection unit arranged in the cloud may collect the failure for both the cloud and the local area network, and notify the control unit arranged in the cloud of the failure detected.

Furthermore, in the first aspect, in a case where the failure detection unit arranged in the cloud detects the failure for all user plane functions arranged in the local area network, the failure detection unit may notify the control unit arranged in the cloud of disconnection as communication between the local area network and the cloud is disconnected. Therefore, an effect of detecting disconnection of communication between the local area network and the cloud is obtained.

Furthermore, in the first aspect, the failure detection unit may include: a failure detection initiator that starts detection of the failure; and a failure detection responder provided for each user plane function to detect the failure in response to start of the detection of the failure.

BRIEF DESCRIPTION OF DRAWINGS

FIG. 7 is a diagram illustrating a first example of states of user plane functions grasped by the resource management function 190 according to the embodiment of the present technology.

FIG. 8 is a diagram illustrating a second example of states of user plane functions grasped by the resource management function 190 according to the embodiment of the present technology.

FIG. 10 is a diagram illustrating a third example of states of user plane functions grasped by the resource management function 190 according to the embodiment of the present technology.

FIG. 12 is a diagram illustrating a fourth example of states of user plane functions grasped by the resource management function 190 according to the embodiment of the present technology.

FIG. 15 is a diagram illustrating a fifth example of states of user plane functions grasped by the resource management function 190 according to the embodiment of the present technology.

FIG. 16 is a diagram illustrating a sixth example of states of user plane functions grasped by the resource management function 190 according to the embodiment of the present technology.

MODE FOR CARRYING OUT THE INVENTION

Modes for carrying out the present technology (hereinafter, referred to as embodiments) will be described below. The description will be given in the following order.

1. First Embodiment (Example of Recovering Failure by Changing Association Between Terminal and User Plane Function)
2. Second Embodiment (Example of Selecting New User Plane Function)
3. Third Embodiment (Example of Failure Detection by Failure Detection Initiator and Failure Detection Responder)

1. First Embodiment

[Wireless Communication System]

Figure 1:
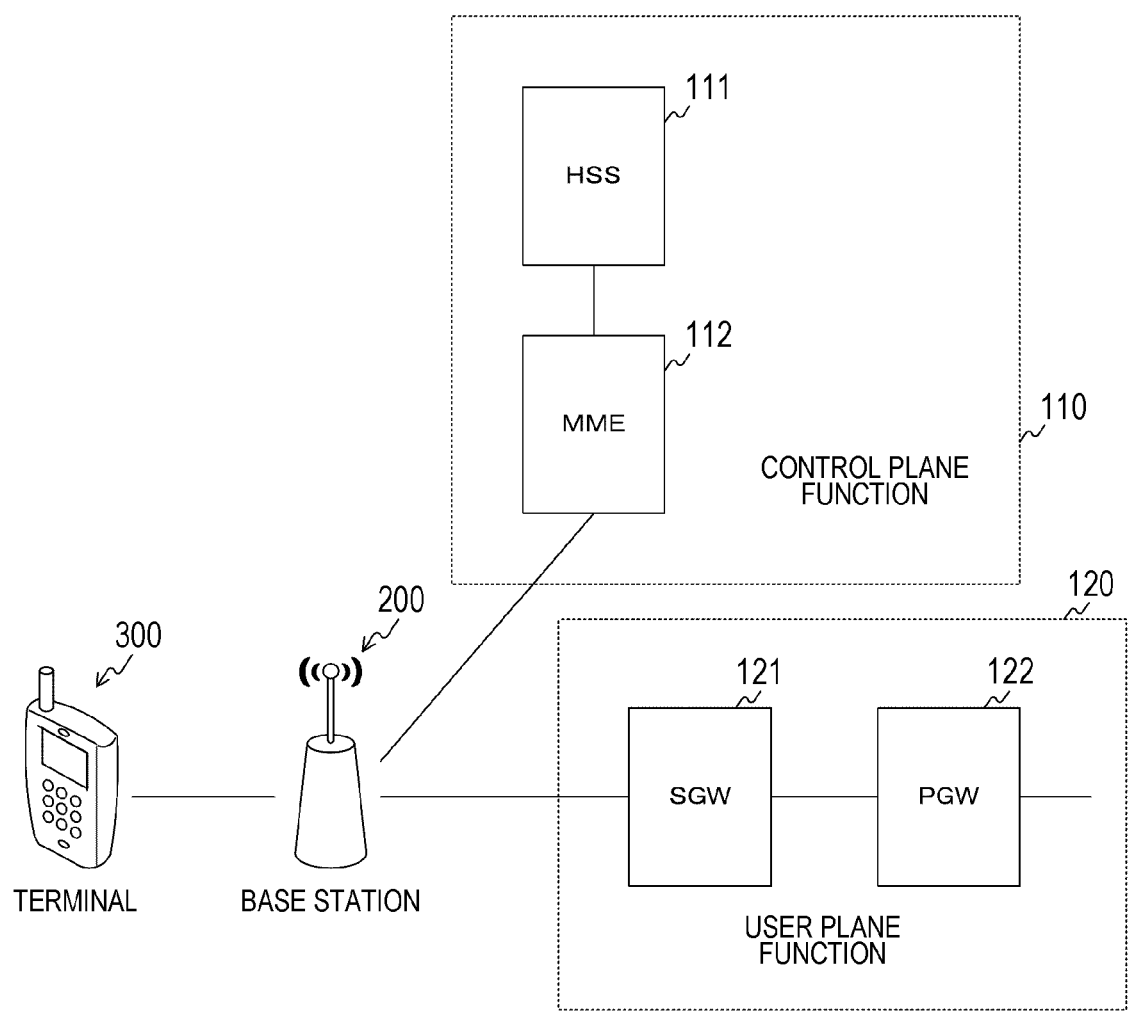
FIG. 1 is a diagram illustrating a first example of a wireless communication system assumed in an embodiment of the present technology.

FIG. 1 is a diagram illustrating a first example of a wireless communication system assumed in an embodiment of the present technology.

The first example is an example in a case where the embodiment of the present technology is applied to a fourth generation mobile communication system (4G). A terminal 300 is connected to a core network via a base station 200. The terminal 300 and the base station 200 are connected by a RAN which is a radio system.

The core network mainly performs permission and session management when the terminal 300 is connected to the network, and is referred to as an evolved packet core (EPC) in 4G. The 4G core network is divided into a control plane function 110 and a user plane function 120, and the former controls the network and the latter performs packet forwarding. Note that the control plane function 110 is an example of a control unit described in the claims. Furthermore, hereinafter, the control plane function 110 may be simply abbreviated as a control plane. Similarly, the user plane function 120 may be simply abbreviated as a user plane.

The 4G control plane function 110 includes an HSS 111, an MME 112, and the like. The home subscriber server (HSS) 111 is a database server that manages user information. The mobility management entity (MME) 112 is a gateway of a control signal for controlling terminal 300.

The 4G user plane function 120 includes an SGW 121, a PGW 122, and the like. The serving gateway (SGW) 121 is a gateway of user data. The packet data network gateway (PGW) 122 is a gateway for connecting to an external network.

In 4G, the subscription information of the terminal 300 and the key for encryption are received from the HSS 111 in which the subscriber information of the terminal 300 is stored, and it is determined whether or not the terminal 300 may connect to the network, and the key for encryption is generated or the like. That is, it is necessary for the terminal 300 to store, in the HSS 111, information of the terminal 300 associated with a subscriber number called international mobile subscriber identity (IMSI) in a subscriber identity module (SIM) card in the terminal 300 in order to connect to the network. Furthermore, the MME 112 plays a role in order for the terminal 300 to attach to the cellular system.

Figure 2:
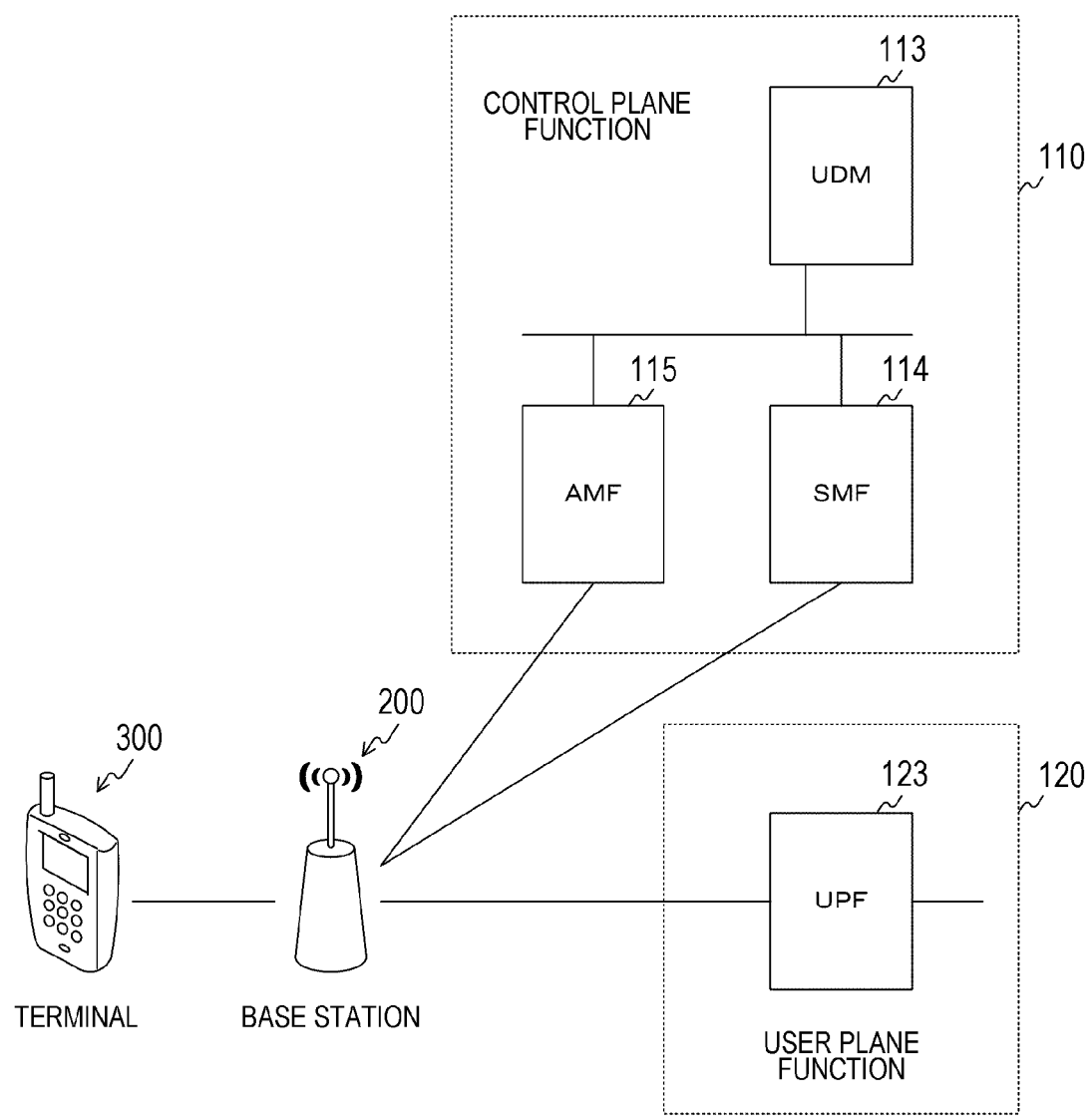
FIG. 2 is a diagram illustrating a second example of a wireless communication system assumed in the embodiment of the present technology.

FIG. 2 is a diagram illustrating a second example of a wireless communication system assumed in the embodiment of the present technology.

The second example is an example in a case where the embodiment of the present technology is applied to a fifth generation mobile communication system (5G). A point that the terminal 300 is connected to the core network via the base station 200 and the terminal 300 and the base station 200 are connected by the RAN is similar to the case of 4G described above.

The 5G control plane function 110 includes a UDM 113, an SMF 114, an AMF 115, and the like. The unified data management (UDM) 113 manages subscriber information. The session management function (SMF) 114 performs session management. The access and mobility management function (AMF) 115 performs authentication, position management, and the like of the terminal.

The 5G user plane function 120 is not separated unlike the SGW 121 and PGW 122 of 4G, and is referred to as a user plane function (UPF) 123 here.

In 5G, the UDM 113 has a similar function to the above-described HSS 111. Hereinafter, the notation HSS 111 is used, but this can also be applied to the UDM 113. Furthermore, the AMF 115 and the SMF 114 play roles in order for the terminal 300 to attach to the cellular system.

Figure 3:
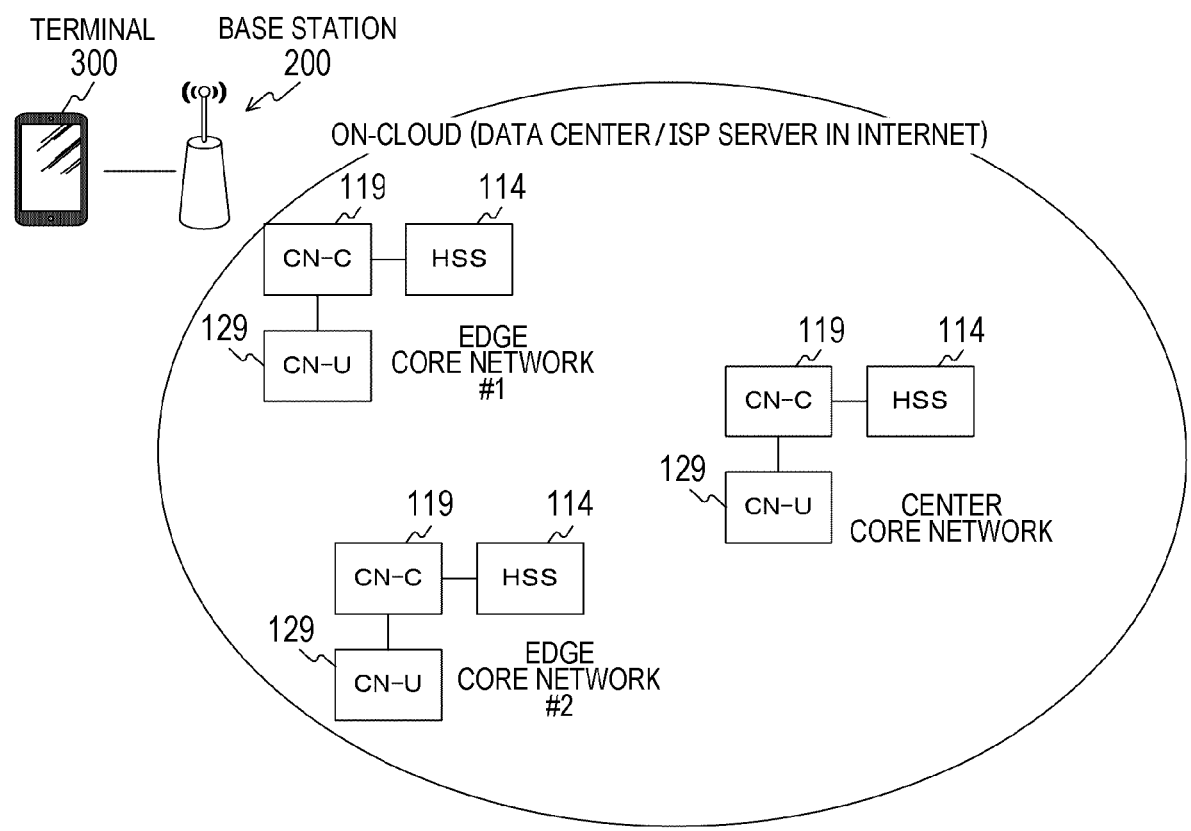
FIG. 3 is a diagram illustrating an arrangement example of a core network according to the embodiment of the present technology.

FIG. 3 is a diagram illustrating an arrangement example of a core network according to the embodiment of the present technology.

The 4G PGW 122 and the 5G UPF 123 serve as a gateway serving as a boundary between the core network and the general Internet. Since this embodiment is considered to be deployed in both the core network and the general Internet, the user plane function of the core network, a CN-U 129, which corresponds to the PGW 122 and UPF 123, can be regarded as a gateway arranged at the boundary between the core network and general applications. Similarly, here, a component corresponding to the MME 112, the SMF 114, and the AMF 115 is indicated as a CN-C 119.

It is known that when the core network is arranged near the terminal 300 and the base station 200, the latency required in the cellular part is reduced. Therefore, it is expected that the number of core networks arranged at the edge of the Internet will increase. However, also in this case, it is useful to arrange a core network not arranged at the edge as a center core network. This is because the center core network may be used when the core network is not arranged at the edge. Note that the expression "core network arranged at an edge" may be replaced with the expression "one or more core network nodes arranged at an edge in the core network". Furthermore, the "edge" may mean that it is arranged near the terminal 300 or the base station 200 (for example, an access point of the terminal 300).

In the future, in a situation where there is a center core network, it is expected that a large number of core networks are arranged at the edge of the Internet in various places in the world. In some cases, a core network may be arranged in a LAN in a factory, a hospital, or an office. At least, it is considered that the base station 200 is disposed in a local area such as a factory, a hospital, or an office, and a core network is locally disposed or disposed on the Internet near the local area. In any case, a low-cost system is required in such a local cellular system. These may also be referred to as private 4G (local 4G) or private LTE (local LTE), private 5G (local 5G), or the like.

[Throughput]

The user plane function implemented by the SGW 121 and the PGW 122 or the UPF 123 has a maximum throughput that can be processed as an index of the capability. For example, it is an index indicating that 100 Mbps user data (user plane data) can be processed or the like. Suppose that there is a user plane function of the core network that processes 100 Mbps, and the processing capability of one base station 200 is 100 Mbps. In this case, when one terminal uses the network, the one terminal can enjoy a speed of 100 Mbps. Meanwhile, in a case where there are 10 sets of such base stations 200 and terminals, the capability of the user plane of the core network becomes a bottleneck, and each terminal can obtain only a throughput of 10 Mbps.

Figure 4:
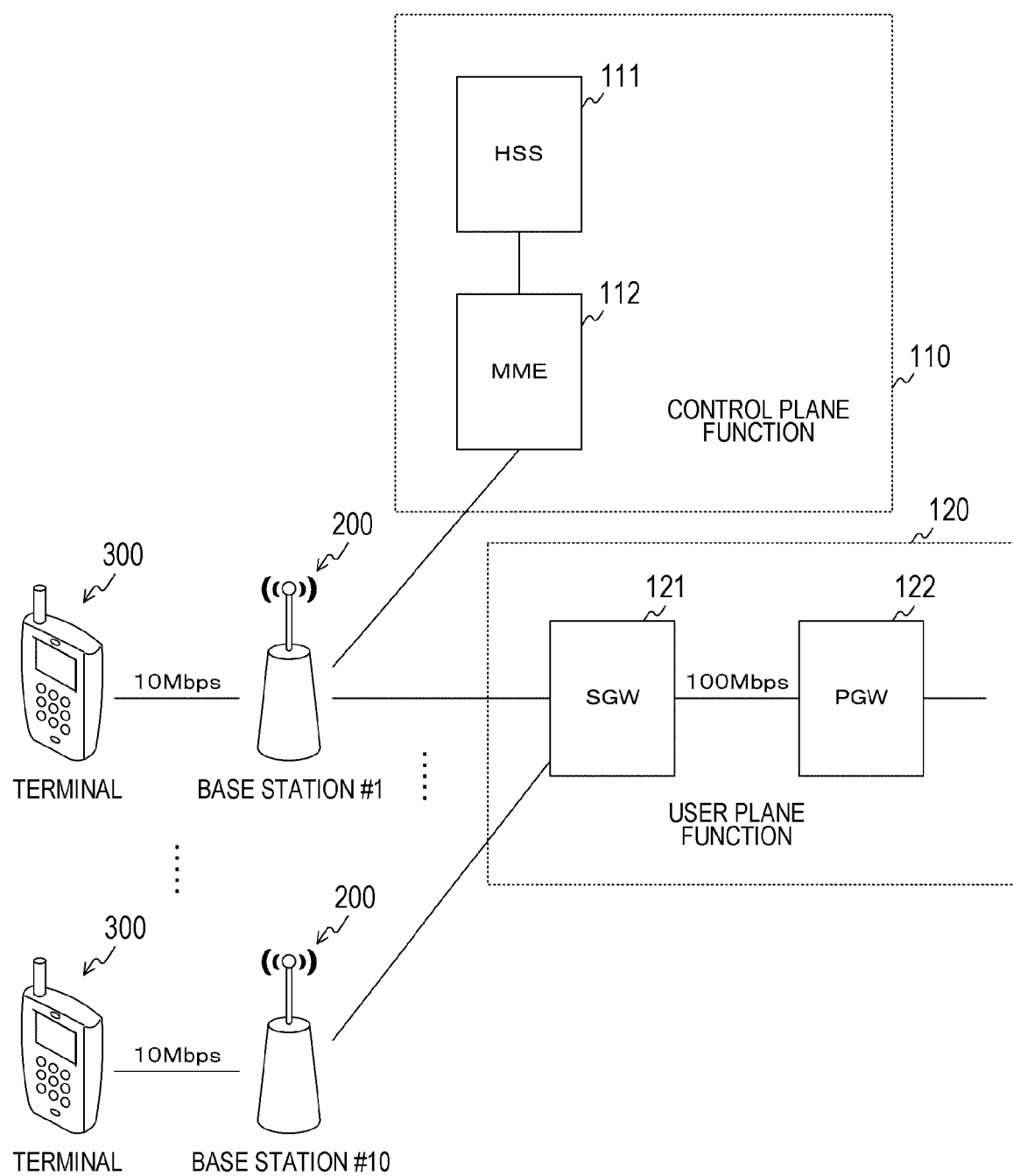
FIG. 4 is a diagram illustrating an example of a case where the core network is a bottleneck.

FIG. 4 is a diagram illustrating an example of a case where the core network is a bottleneck. With respect to the user plane function of the core network that processes 100 Mbps, when the numbers of terminals 300 and base stations 200 increases, the capability of the user plane may become a bottleneck. When the number of base stations 200 and the number of terminals 300 increase in this manner, it is necessary to improve the capability of the user plane of the core network.

When the capability of the user plane of the core network is improved, that is, scaling is performed, static scaling and dynamic scaling are considered. The static scaling is a method in which once the number of user planes is determined, the core network is activated, the base station 200 is connected, and the operation is started, the number of user planes is basically not changed. Meanwhile, the dynamic scaling is a method of flexibly increasing or decreasing the number of user planes in response to a change in the number of terminals 300.

A method for dynamically increasing or decreasing the number of user planes is very difficult. This is because there may be a case where it is necessary to change the settings of the base stations 200, and there may be a case where the function of allocating a new PDU session to the user plane function takes time and effort to notice the presence of a changed user plane and update an internal table or the like. Since a core network for a local cellular system referred to as the above-described private LTE, private 5G, or the like needs to be created at low cost, it has been difficult to take such trouble. At the time of this scaling, it is necessary to determine whether the number of user plane functions should be increased or decreased by some function in either a dynamic or static method.

Figure 5:
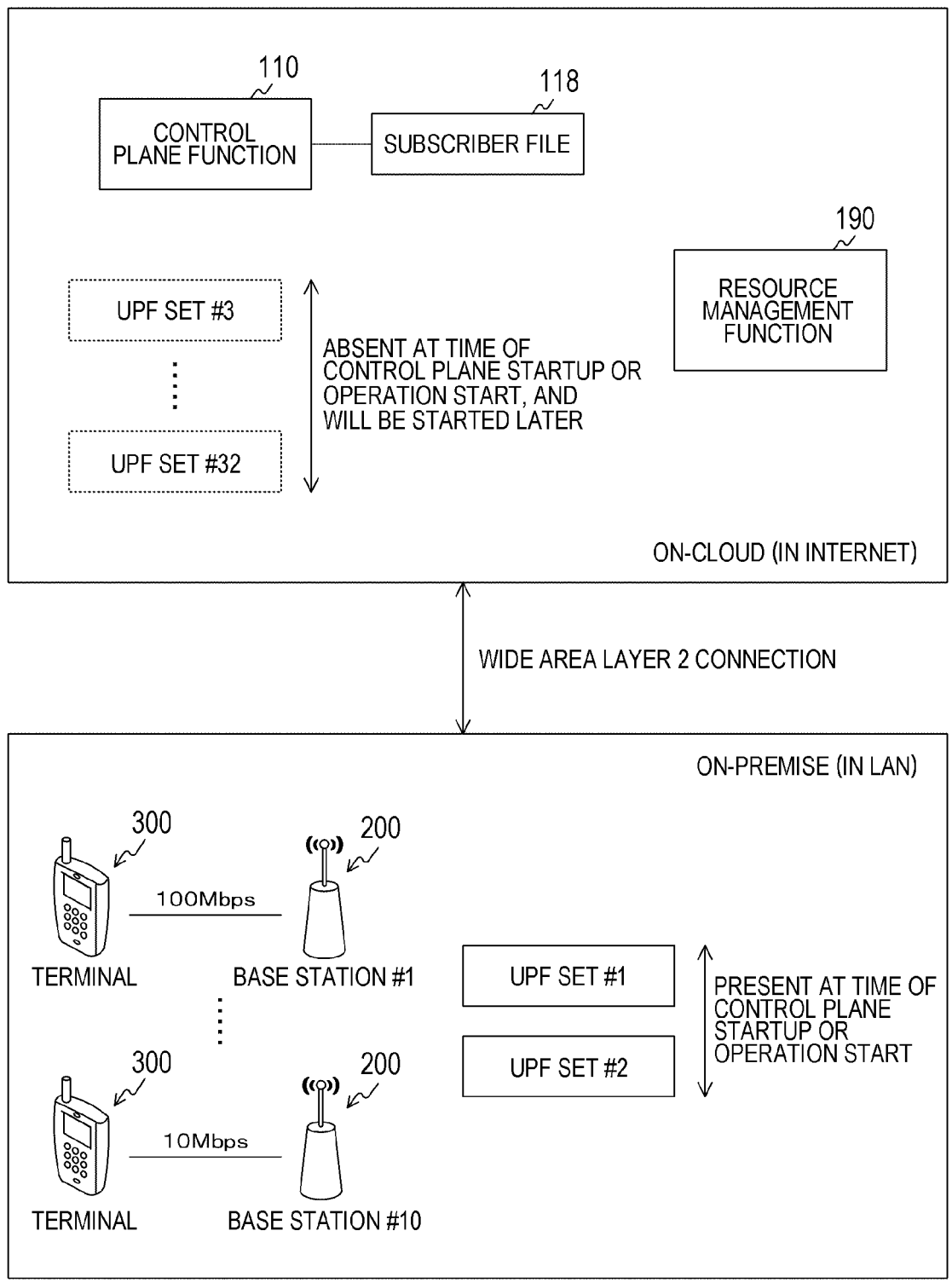
FIG. 5 is a diagram illustrating an example of a wireless communication system according to the embodiment of the present technology.

FIG. 5 is a diagram illustrating an example of a wireless communication system according to the embodiment of the present technology.

In this embodiment, the terminal 300 and the base station 200 are disposed in a local area network (LAN). Furthermore, in this embodiment, the control plane of the core network is arranged in a cloud on the Internet. Meanwhile, the user plane function of the core network may be arranged in an on-premise LAN or may be arranged in an on-cloud.

The user plane function arranged in the LAN cannot be increased unless facilities such as personal computers (PCs) or the like are enhanced. Meanwhile, the user plane function arranged in the cloud can be easily added by adding a virtual machine on the cloud and activating a program of the user plane function in the virtual machine. The user plane function is only required to be deleted by stopping the program of the user plane function and then deleting the virtual machine. Therefore, addition or deletion of the user plane function is mainly addition or deletion of the user plane function arranged on the cloud.

The data centers of the LAN and the cloud are desirably connected by wide area layer 2 connection. This is to facilitate connection between the base station on the LAN side and the core network on the cloud side by reducing network address translation (NAT translation).

The function of adding or deleting a user plane function on the cloud is referred to as a resource management function 190. The resource management function 190 needs to determine whether to add or delete a user plane function on the basis of a network status. In 3GPP, the resource management function 190 may also be referred to as management and network orchestration (MANO). Note that the resource management function 190 is an example of a control unit described in the claims.

Conventionally, there is known a method of measuring what Mbps speed can be obtained by using a network traffic amount measurement tool, for example, a tool such as iperf3 or ping, for a user plane function to be measured in use. In this method, the iperf3 server is disposed in a virtual machine inside or in the vicinity of the user plane function, and the iperf3 client is disposed on the LAN side to perform measurement. Therefore, it is possible to measure the degree of congestion of traffic on the channel of the communication path to the user plane function.

Even if this information is acquired, it is not possible to know in which communication path traffic is congested, and thus it is not sufficient as information for determining whether to add or delete the user plane function. Furthermore, the network measurement tool measures how much the traffic amount can be improved by actually generating traffic. However, traffic generated by the network traffic amount measurement tool may affect communication of important user data, leading to a decrease in the traffic amount of the user data and deterioration of latency characteristics. In particular, in the private 5G/4G, since the LAN part is often a fragile network, it is not desirable that the network traffic amount measurement tool actually transmit test data in such a network.

Therefore, in this embodiment, the resource management function 190 roughly focuses on the following two pieces of information. The first is a user plane function processing capability. Furthermore, the second is a condition of traffic flowing through the network. There are two types of traffic flowing through the network: a channel common to each user plane function and a channel unique to each user plane function. The former is mainly a LAN communication path, and the latter is mainly a different communication path for each cloud user plane function.

First, the processing capability of the first user plane function will be examined. The user plane function is designed as software. In a case where the processing capability of the software is, for example, 100 Mbps, 100 Mbit user data can be processed in one second. At this time, in a case where the status of use of the user data is 80 Mbps, which is close to 100 Mbps, it is desirable to add another user plane function and perform processing together with the added user plane function because the processing capability increases. Of course, in a case where the number of user plane functions is increased, a cloud virtual machine is added, and thus there is also a negative aspect that the cost increases for private 5G/4G network operators.

Second, the condition of traffic flowing through the network will be examined next. Even if it is determined that it is better to add a user plane function from the viewpoint of the processing capability of the first user plane function, it is considered that throughput performance is not improved even if the user plane function is increased in a situation where traffic of the network is congested. Therefore, it is important to grasp the condition of traffic of the network. Here, there are roughly two conditions of traffic of the network. One is the congestion status of the traffic of the network on the LAN side, and the other is the congestion status of the traffic of the network on the cloud side.

The user plane functions arranged on the cloud side use a common LAN, pass through the same path in the Internet at the subsequent stage, and pass through different channels when distributed to each user plane function at the end. That is, the communication path is divided into a common communication path and a communication path unique to each user plane function. Then, it can be said that the common communication path is greatly influenced by the LAN.

Figure 6:
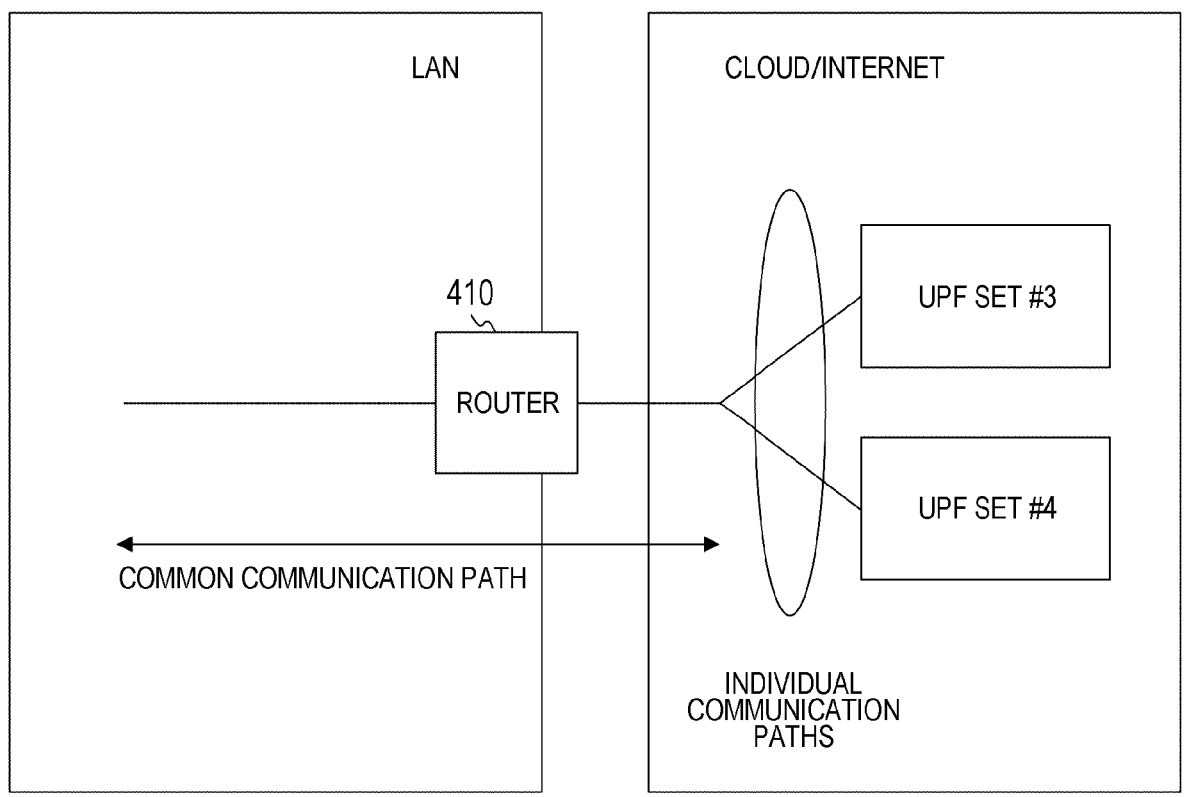
FIG. 6 is a diagram illustrating an example of communication paths of the wireless communication system according to the embodiment of the present technology.

FIG. 6 is a diagram illustrating an example of communication paths of the wireless communication system according to the embodiment of the present technology.

In this example, it is assumed that a connection to the Internet is established from a LAN through a common communication path with a router 410 as a gateway.

Here, the common communication path will be examined. There may be a case where the branch is made in the router 410 disposed at the boundary between the Internet Services Provider (ISP) that provides the Internet to the LAN and the LAN. Furthermore, there may be a case where the communication path is branched into individual communication paths in the communication path of the ISP after the LAN. Furthermore, there may be a case where the communication path is branched into individual communication paths in a data center of a cloud at a subsequent stage. In any case, all the traffic that has reached each user plane function on the cloud side passes through the common communication path.

[Detection of Network Failure]

A 5G or 4G cellular network includes a terminal, a base station, and a core network, as described above. Furthermore, in order to connect network functions such as base stations, core networks, and the like, network devices such as switches, routers, and the like and communication cables such as Ethernet, optical fiber, and the like are present. When they fail, certain functions of the network stop working. The cellular network is an infrastructure, and various services and applications are operated using the infrastructure. Therefore, when a network failure occurs, it is necessary to quickly recover the functions of the network. Failure detection and recovery are very important because unlike wireless local area networks, cellular networks often handle critical data. Furthermore, since the private 4G or 5G is a small system, it is assumed that a large number of systems operate simultaneously in the world. If the failure and the detection are not automated, a large number of systems cannot be handled. Therefore, it is necessary to perform failure detection and recovery without taking time and effort.

Here, parts that may cause failure are summarized. First, regarding the network function, a failure of a base station, a core network, or a computer on which a virtual machine in which a core network is disposed is mounted, a malfunction of a device, a power failure, or the like is assumed. As for a network device, a failure of a switch, a router, or the like, a malfunction of a device, a power failure, or the like is assumed. Furthermore, regarding a communication cable, disconnection or the like of an Ethernet cable or an optical fiber, specifically, a cable is assumed.

Note that, in the present embodiment, a case where a failure occurs in a network function such as a user plane function or the like refers to a state where the function of the user plane function cannot be used. For example, in a case where a program called a user plane function cannot be activated, and in a case where a computer or a virtual machine on which the program of the user plane function is installed cannot operate due to a power failure or a crash of the computer, disconnection of a local area network cable or an optical fiber for reaching the user plane function or the like is assumed, but the reason is not limited.

[Recovery of Network Failure]

Network recovery can be roughly broken down into three procedures. First is a procedure for detecting a network failure. At that time, an approach of periodically confirming whether or not communication with the other party is possible is basic. Second is a procedure of forwarding an alarm of the detected network failure to an appropriate partner. Third is a procedure of receiving an alarm of a network failure and recover the failure. At that time, an approach of resetting the computer where the failure occurred again and testing whether or not the computer can be recovered, or an approach of installing the same function in another computer and switching the function where the failure occurred by switching the communication path to the other computer is basic.

[Network Failure of LAN and Network Failure of Cloud]

As described above, a local cellular network called private 4G/5G includes a LAN part and a cloud part in the Internet. In particular, the user plane functions are arranged on both the LAN side and the cloud side without distinction. A terminal that requires a low latency may use user plane functions on the LAN side.

Although failures occur on both the LAN side and the cloud side, failures on the cloud side are considered to be more frequent. Moreover, the LAN is connected to the cloud via the ISP, but in a case where a failure occurs in the network of the ISP, a failure may occur in which traffic cannot flow from the LAN to the cloud. In this case, functions completed only in the LAN can be operated, but it is a failure that communication between functions arranged on the cloud side and functions arranged in the LAN cannot be performed.

Types of failure include the following three types of failure. First is a failure on the LAN side. Second is a failure on the cloud side. Third is a failure in which communication cannot be performed between the functions arranged in the cloud and the functions arranged in the LAN since the LAN cannot be connected to the outside Internet.

In this embodiment, the discussion will be given focusing on the failure on the cloud side rather than the failure on the LAN side. This is because it is assumed that the number of user plane functions arranged on the cloud side is larger than the number of user plane functions arranged on the LAN side.

Next, it is also very important to cope with an event in which the LAN cannot connect to the Internet and the devices arranged in the LAN and the devices arranged in the cloud cannot communicate with each other. This is because in the private 4G or 5G network, the terminals and the base stations are always disposed on the LAN side. That is, in a case where the core network is disposed in the LAN, the cellular network can continue to operate only in the LAN even if a failure occurs that the connection from the LAN to the outside Internet cannot be established. For example, in a case where the private 4G or 5G is used for applications such as a cellular system in a factory or the like, the private 4G or 5G functions correctly if only the LAN operates without failure.

[Control Plane Function Failure and User Plane Function Failure of Core Network]

The core network can be divided into a control plane function and a user plane function in both the 4G system (LTE) and 5G system. For 4G, the control plane function is an MME, and the user plane function is an SGW and a PGW.

For the user plane function, a plurality of user plane functions may be arranged because there is a limit to a traffic processing amount that can be processed by one user plane function or the like. In order to arrange a plurality of user plane functions in different locations, any user plane function may lose functionality due to network failure. Therefore, for the control plane function, it can be said that the larger the number of user plane functions, the higher the probability of causing a failure. The following mainly deals with a failure of a user plane function of the core network, and then deals with a failure of a control plane function of the core network.

As described above, the user plane function of the core network is desirably disposed on both the LAN side and the cloud side. This is because when a failure occurs, a virtual machine is newly prepared, and the user plane function program is activated again, so that recovery can be performed. This is because the LAN side has an advantage of low latency, but is not good at scaling to easily increase or decrease the number of user plane functions. Even when a failure occurs on the LAN side, it is difficult to automatically prepare a new computer from a remote place, so that recovery from the failure is not easy.

Meanwhile, it will be considered whether the control plane function should be arranged in the LAN or the cloud when considering the aspect of failure. The control plane function needs to control both the LAN side user plane function and the cloud side user plane function. Therefore, it is sufficient to dispose on either the LAN side or the cloud side, but it is considered that the cloud side is easy to recover.

The advantages and disadvantages of the arrangement on the LAN side will be considered. When a failure that the LAN cannot be connected to the Internet occurs, there is an advantage that the cellular system can be operated together with the base station and the terminal together with the user plane function left on the LAN side. Meanwhile, since the MME is disposed not in a virtual machine on the cloud but in a physical machine connected to the LAN, there is a disadvantage that it takes time and effort to recover the failure when the failure occurs to replace the physical machine or the like.

The advantages and disadvantages of the arrangement on the cloud side will be considered. In a case where the LAN cannot be connected to the Internet, there is a disadvantage that the control plane function arranged on the cloud side cannot control the base station and the user plane function arranged in the LAN. Meanwhile, in a case where there is a failure in the control plane function or the network around the control plane function, for example, there is an advantage that the control plane function can be easily recovered by activating a virtual machine in another data center in the vicinity and reactivating the control plane function program in the virtual machine.

In the private 4G or 5G, it is necessary to consider ease of installation at low cost, and it is difficult to select to arrange the control plane function on the LAN side from the beginning. Basically, the control plane function is disposed on the cloud side, and when a failure occurs, the control plane function is switched to another control plane function on the same cloud side. When a failure in which the LAN and the cloud cannot be connected occurs, switching to the control plane function arranged on the LAN side may be performed. It is also conceivable that the cost is prioritized and not dealt with so much. In the case of cost priority, it is considered that it is better to consider coping with a failure of the control plane function on the cloud side.

In summary, in a case where the user plane function is arranged in the LAN, the installation cost increases although the latency is low. Meanwhile, in a case where the user plane function is arranged in the cloud, the installation cost is low, but the latency is large. From the viewpoint of failure, the frequency of occurrence of failure is smaller when the user plane function is arranged in the LAN than when the user plane function is arranged in the cloud. Furthermore, it is easier to recover from a failure by arranging the user plane function in the cloud than by arranging the user plane function in the cloud. Furthermore, in a case where the LAN is disconnected from the outside Internet, if the user plane function is arranged in the LAN, the operation can be performed only with the LAN, but if the user plane function is arranged in the cloud, the operation cannot be continued.

When the IP address of the control plane function is set to the base station, a message called an S1-setup request is transmitted from the base station to the control plane function. Then, by returning an S1-setup response from the control plane function to the base station, connection between the base station and the control plane function is established. Some base stations require several tens of minutes to switch to a new control plane function. Therefore, although it is desirable to avoid switching of the control plane function as much as possible, switching at the time of failure is unavoidable. However, it is necessary to accept that the cellular service is temporarily interrupted.

Meanwhile, in the case of the user plane function, it is possible to recover the user plane function by assisting the user plane function where the failure occurred with another user plane function while continuing the cellular service.

Hereinafter, the function refers to the control plane function or the user plane function of the core network. In a case where the function #0 causes a failure and switching to the function #1 is performed, it is considered that there is basically no need to return to the original function #0 in a case where the function #0 is reactivated and recovered. This is because the switching between the functions takes time, and thus the influence on the communication of the terminal is less if the function of the switching destination is continuously used as it is unless there is no reason to restore the function.

In consideration of the difference in failure between the LAN side and the cloud side, for example, even in a case where a failure occurs on the cloud side, it is considered that the switching destination is preferably the same cloud side. When switching to the LAN side is performed, the performance of the user plane function arranged in the LAN and the performance of the user plane function arranged in the cloud are greatly different from each other in terms of latency, and thus, it is necessary to restore the performance. In the case of switching between user plane functions of the cloud that would have similar performance, it is not necessary to return to the original user plane function. Basically, it is considered that it is preferable to perform switching between functions arranged in a network (cloud or LAN) having the same characteristics, and to perform switching across the LAN and the cloud only in a case where it is impossible to do it.

Usually, it is necessary to prepare a user plane function dedicated to backup of a user plane function where failure occurs. In the private 5G/4G, since a plurality of user plane functions, for example, one to 32 or the like is prepared as the number of user plane functions, it is necessary to have, for example, one to 32 backup user plane functions for switching at the time of malfunction for each user plane function. In this case, a total of two to 64 user plane functions are included. This is a non-negligible cost for systems where the low cost is important such as a private 5G/4G. The cost here is the cost of a computer for activating a user plane function program. In the private 5G/4G system, there may be a mixture of a system in which user plane functions are arranged in a LAN and a system in which user plane functions are arranged in a cloud. In such a case, how to recover the failed user plane function becomes a problem.

[Transfer Upon Occurrence of Failure]

Therefore, in the case of a system having a plurality of user plane functions, a user plane function where failure occurred is transferred to remaining user plane functions in normal operation to recover from the failure. Association between terminals and user plane functions is performed in the subscriber information of the subscriber file. The association between terminals and user plane functions is rewritten in the subscriber file for a terminal using a user plane function where failure occurred to use another user plane function. At that time, it is necessary to determine to which user plane function the transfer is performed.

As a first approach of transfer, it is conceivable to perform transfer to the user plane function of the number next in the consecutive number. For example, in a case where the number of user plane functions in operation is five, the user plane function is transferred to the user plane function with the number next to the number of the failed user plane function. In a case where the user plane function #1 fails, the association between the terminal and the user plane function is rewritten so that the terminal using the user plane function #1 uses the user plane function #2. Similarly, in a case where the user plane function #5 fails, the function is transferred to the user plane function #1.

However, in the first approach described above, there is a possibility that the traffic of the user plane function of the transfer destination is congested. Therefore, as a second transfer approach, it is conceivable to prepare one unused user plane function at all times and rewrite the association between the terminal of the subscriber file and the user plane function so as to transfer to the user plane function even if any user plane function fails. The user plane functions #1 to #4 are actually operated, and the user plane function #5 stands by without allocating a terminal for backup of the user plane functions #1 to #4. Then, when any of the user plane functions #1 to #4 fails, the user plane function #5 is transferred to be used.

In this second approach, there is a problem that resources of the user plane function #5 for backup are wasted. Furthermore, when a plurality of user plane functions fails, only the user plane function #5 cannot accommodate the traffic of the failed user plane functions. Therefore, as a third approach of transfer, it is conceivable to transfer to a user plane function having a low processing usage rate among the user plane functions. According to the third approach, efficient transfer can be performed without wasting a user plane function.

In the third approach, the processing usage rate (transfer destination UPF processing usage rate) of the user plane function as the transfer destination for the terminal associated with the failed user plane function is obtained by, for example, the following formula.

Transfer destination UPF processing usage rate=Current processing traffic amount/Program processing traffic capability of UPF For example, in a case where the user plane function program processing capability is 100 Mbps and the current processing capacity is 80 Mbps, "0.8" is the ratio of the room capacity. A case of "0.0" means that there is full processing capacity, and "1.0" means that no processing capability remains.

Furthermore, as another index, in place of the transfer destination UPF processing usage rate, a user plane function processing room traffic amount (transfer destination UPF processing room traffic amount) as the transfer destination, as indicated in the following formula, may be used.

Transfer destination UPF processing room traffic amount=Program processing capability of UPF– current processing traffic amount Furthermore, the processing usage rate of the user plane function may be evaluated not on the basis of the traffic amount but on the basis of the number of terminals belonging to the user plane function. That is, it is determined that the processing usage rate of the user plane function is higher as the number of terminals is larger. Therefore, in this case, the terminals belonging to the failed user plane function are allocated to the user plane functions to which fewer terminals belong. In this case, the following formula can be used as the relationship between the number of terminals and the processing usage rate.

Transfer destination UPF processing usage rate=Number of terminals currently belonging/ maximum value of terminals belonging to one UPF In this way, it is appropriate to transfer to a user plane function that is not used much. Therefore, it is necessary for the resource management function 190 to grasp the current statuses of the user plane functions. Specifically, it is necessary to arrange a traffic amount monitor for each user plane function, and the resource management function 190 needs to periodically grasp the processing usage rate of each user plane function from the traffic amount monitor.

FIG. 7 is a diagram illustrating a first example of states of user plane functions grasped by the resource management function 190 according to the embodiment of the present technology.

In this example, an arrangement position, a state, and a processing usage rate are indicated for each of 32 user plane functions (UPFs). The arrangement position indicates whether the user plane function is arranged in a local area network (LAN) or in a cloud. The state indicates, as an operation state of the user plane function, whether the user plane function is in operation, in stoppage, or in failure. The processing usage rate is the above-described processing usage rate. Here, the state and the processing usage rate are updated to the latest information at least every several seconds.

FIG. 8 is a diagram illustrating a second example of states of user plane functions grasped by the resource management function 190 according to the embodiment of the present technology.

In this example, the arrangement position, the state, and the number of terminals accommodated are indicated for each of 32 user plane functions (UPFs). That is, this is an example of grasping the number of accommodated terminals in order to transfer to a user plane function to which the number of terminals allocated is small. In this example, as transfer destinations of user plane functions where failure occurs, for example, the resource management function 190 can determine that the user plane functions #1 and #30 are promising candidates for the transfer destinations since the numbers of terminals are small. Here, the state and the number of accommodated terminals are updated to the latest information at least every several seconds.

Figure 9:
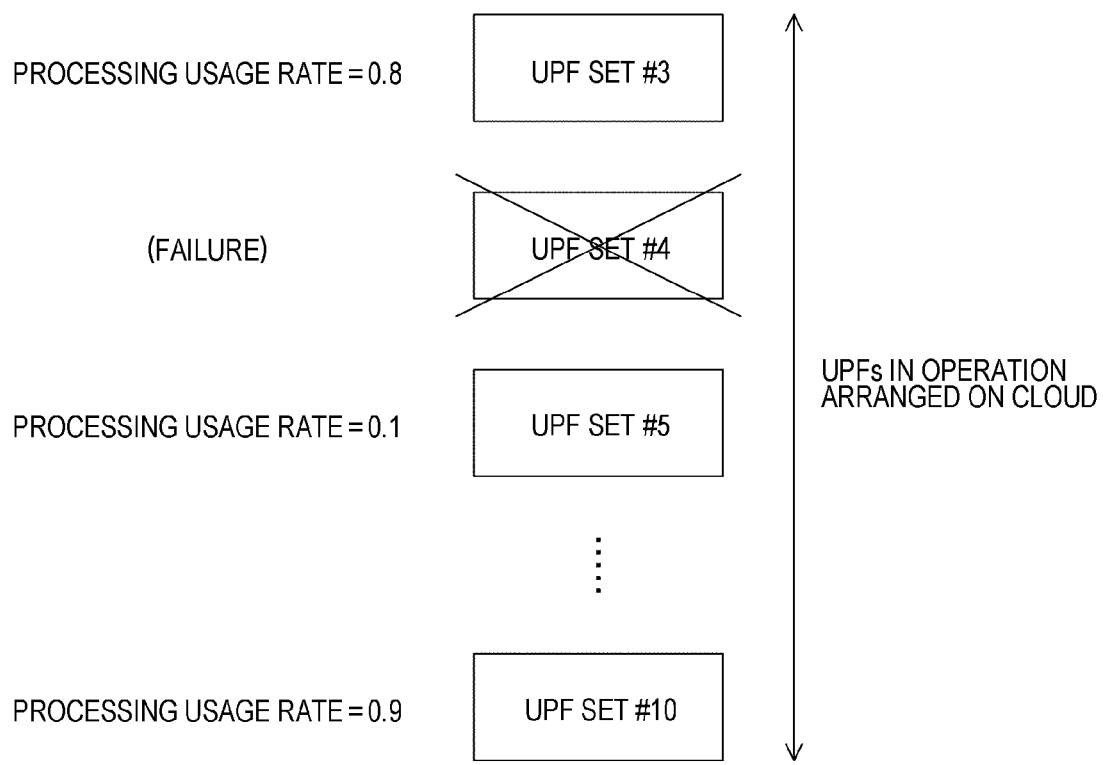
FIG. 9 is a diagram illustrating a first state example of user plane functions according to the embodiment of the present technology.

FIG. 9 is a diagram illustrating a first state example of user plane functions according to the embodiment of the present technology.

In this example, it is assumed that eight user plane functions #3 to #10 are arranged and operated on a cloud. Then, it is assumed that a failure is detected in the user plane function #4. In this case, assuming that the user plane function #5 capable of processing 100 Mbps is using 10 Mbps, the processing usage rate is "0.1", which is more room than other user plane functions. Therefore, in this example, the user plane function #5 is determined as the transfer destination.

Meanwhile, in a case where the processing usage rate of the failed user plane function is "0.9" close to "1.0" or the like, even if the user plane function is to be accommodated in another user plane function, it is considered that only one user plane function cannot accommodate. In this case, it is useful to distribute and transfer to a plurality of user plane functions. For example, in a case where there are nine terminals using a failed user plane function and the UPF processing usage rate is "0.9", it is considered that traffic can be accommodated by allocating three terminals to three user plane functions capable of accommodating the UPF processing usage rate of "0.3". At this time, it is important to store the processing usage rate of the user plane function before malfunction.

FIG. 10 is a diagram illustrating a third example of states of user plane functions grasped by the resource management function 190 according to the embodiment of the present technology.

In this example, for each of 32 user plane functions (UPFs), an arrangement position, a state, a processing usage rate, the number of accommodated terminals, and identifiers of the accommodated terminals are indicated. As the identifiers of the accommodated terminals, for example, the above-described IMSI can be used.

Furthermore, in this example, it is assumed that a failure has occurred in the user plane function #30, and the processing usage rate immediately before the failure has occurred, the number of accommodated terminals, and the identifiers thereof are illustrated. Therefore, in a case where the processing usage rate immediately before the occurrence of the failure is high, it is possible to select distributed transfer as described above.

[Operation]

Figure 11:
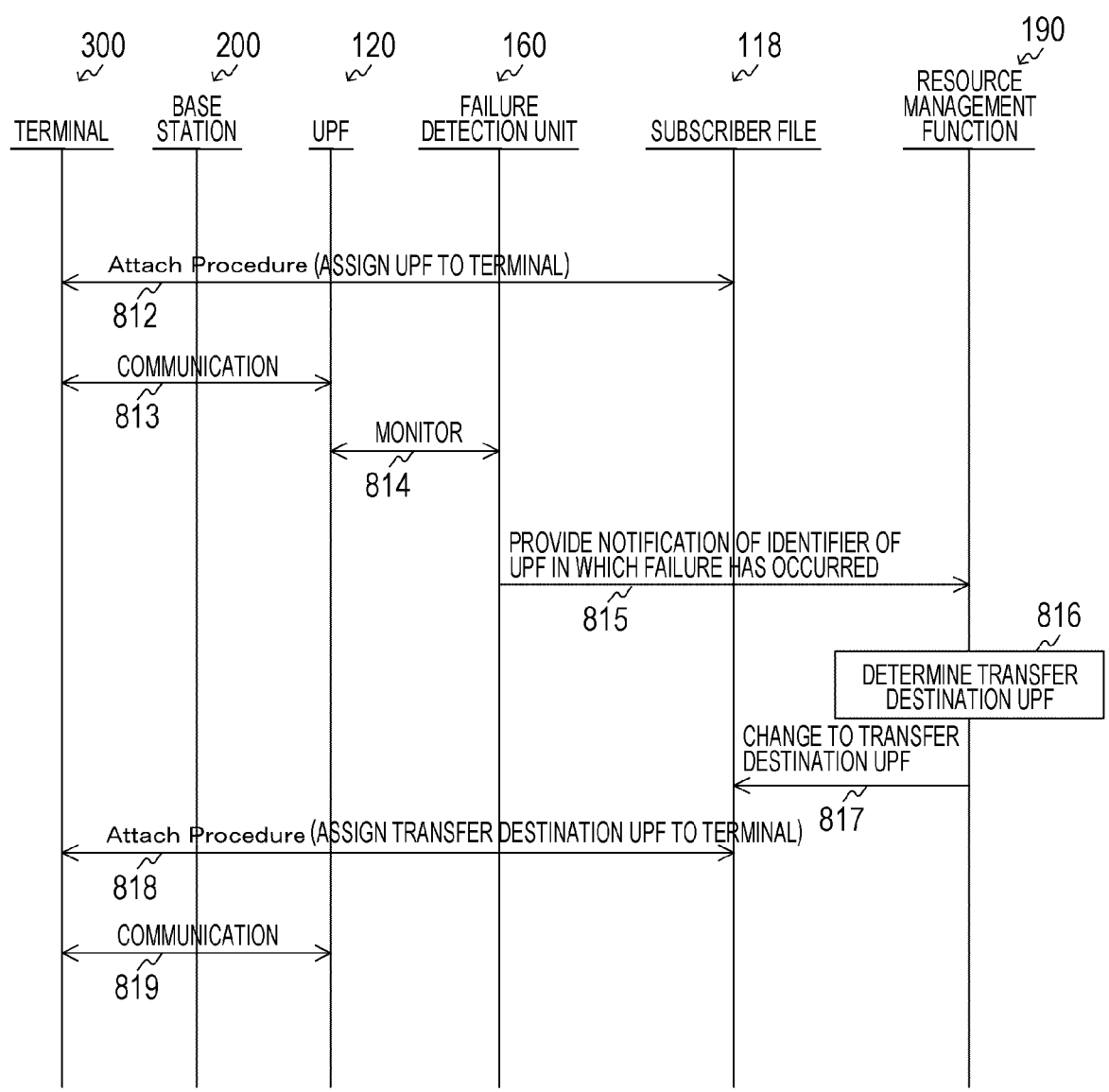
FIG. 11 is a sequence diagram illustrating an example of a processing flow of the communication system according to the first embodiment of the present technology.

FIG. 11 is a sequence diagram illustrating an example of a processing flow of the communication system according to the first embodiment of the present technology.

When the terminal 300 is powered on, an attach procedure operates, and the control plane function 110 assigns the user plane function 120 to the terminal 300 in accordance with the subscriber information in the subscriber file 118 (812). Therefore, the terminal 300 performs communication using the assigned user plane function 120 (813). Note that the subscriber file 118 is an example of a subscriber information holding unit described in the claims.

The failure detection unit 160 monitors the current status of the user plane function 120 (814). Then, when detecting the occurrence of a failure in the user plane function 120, the failure detection unit 160 notifies the resource management function 190 of an identifier specifying the user plane function 120 (815).

Upon receiving the notification from the failure detection unit 160, the resource management function 190 determines a user plane function as a transfer destination (816). At that time, the resource management function 190 considers the processing usage rate of the user plane function where failure occurred and the processing usage rate of the transfer destination user plane function. Note that, as described above, a plurality of user plane functions can be used as transfer destinations.

The resource management function 190 changes the subscriber information of the subscriber file 118 so as to associate the transfer destination user plane function with the terminal 300 instead of the user plane function where failure occurred (817).

Thereafter, the power supply of the terminal 300 is temporarily turned off and turned on again, so that the attach procedure operates again (818). Therefore, the transfer destination user plane function 120 is assigned to the terminal 300 on the basis of the subscriber information of the subscriber file 118. Thereafter, the terminal 300 performs communication using the newly assigned user plane function 120 (819).

As described above, in the first embodiment of the present technology, when a failure occurs in a user plane function, it is possible to efficiently recover the failure by determining a user plane function with a low processing usage rate among user plane functions in operation as a transfer destination.

That is, since the number of user plane functions to be prepared as transfer destinations can be reduced, it is possible to recover failure at low cost. Furthermore, since it is only necessary to rewrite the subscriber file, it is possible to recover the failure by the core network simply and at low cost. Furthermore, since this mechanism only transfers to the user plane function that has been in operation, it is possible to minimize service interruption by the terminal.

2. Second Embodiment

In the first embodiment described above, the arrangement and the like of the user plane function of the transfer destination are not particularly limited. However, it is desirable to avoid a significant change in the property viewed from the terminal before and after transfer as much as possible. Therefore, in the second embodiment, the selection of the user plane function of the transfer destination is further studied.

In a case where a user plane function fails and stops, another user plane function is used as a backup instead of the user plane function where failure occurred. It is desirable that the switched user plane function is continuously used. That is, when the user plane function in which the failure has occurred is corrected, returning to the user plane function in which the failure has been corrected is undesirable in consideration of a procedural waste and a time during which user data cannot be transmitted and received. That is, it is desirable to continue to use the user plane function that has been switched and started to be used due to a failure.

The user plane function may be arranged in a data center of a cloud of the Internet, or may be arranged on a computer such as a PC of a LAN or the like. When the user plane function disposed in the data center of the cloud causes a failure and is switched to a user plane function of the LAN, the property of the user plane function of the LAN is greatly different from the property of the user plane function of the cloud. Therefore, the user plane function is switched to the user plane function largely different from the original state, and there is a problem in that the switched user plane function is continuously used.

Therefore, when the user plane function arranged in the LAN causes a failure, the user plane function is switched to a user plane function arranged in the LAN, and when the user plane function arranged in the cloud causes a failure, the user plane function is switched to a user plane function arranged in the cloud.

In a case where the user plane function disposed in the LAN fails, basically, the transfer to a user plane function disposed in the LAN is performed. However, only in a case where there is no user plane function disposed in the LAN as an appropriate transfer destination, the transfer to a user plane function of the cloud is performed. This is because the number of user plane functions prepared in the LAN is usually smaller than the number of user plane functions arranged in the cloud. In a case where the failed user plane function of the LAN is transferred to a user plane function of the cloud, it is considered that the user plane function of the cloud needs to be transferred again to the user plane function of the LAN after the recovery of the user plane function of the LAN.

The reason why there is a case where there is no user plane function arranged in the LAN as an appropriate transfer destination is as follows. For example, this is the case where, in a case where there are two user plane functions in the LAN and one of the two user plane functions fails, the traffic amount processed by the remaining one user plane function is large or the like. For example, when each user plane function has an ability to process 100 Mbps, the traffic of the user plane function that has failed cannot be accommodated in a case where the current traffic amount is 90 Mbps. In this case, the traffic of the user plane function where failure occurred in the LAN is transferred to a user plane function of the cloud. This is an undesirable but possible case.

Meanwhile, it is considered that there are few cases of transferring from the cloud to the LAN. This is because the cloud has many resources for arranging user plane functions. This is because any number of computers can be virtually arranged. It is necessary for a person to arrange a computer in the LAN, and the number of user plane functions cannot be increased without limitation.

A terminal using a user plane function of a LAN may have used a low-latency application. This is because the user plane function disposed in the LAN close to the base station has less latency required for communication than the user plane function disposed in the cloud. In a case where the user plane function of the LAN causes a failure and transfer to another user plane function of the same LAN is difficult, transfer to a user plane function of the cloud cannot be performed unconditionally. This is because there may be a case where it is better to wait for recovery of the user plane function of the LAN while a failure has occurred than to transfer the low-latency application to a user plane function of the cloud. Therefore, it is conceivable to set in advance in the resource management function 190 whether or not to permit transfer to the cloud in the user plane function of the LAN.

FIG. 12 is a diagram illustrating a fourth example of states of user plane functions grasped by the resource management function 190 according to the embodiment of the present technology.

In this example, for each of 32 user plane functions (UPFs), information on whether or not transfer from the LAN to the cloud is permitted when a failure occurs is indicated in addition to the arrangement position, the state, and the processing usage rate.

The order in which the items are evaluated varies depending on the scenario. For example, when a user plane function including an application that places importance on latency time fails, it is desirable to transfer the user plane function that has failed in the LAN to a user plane function of the LAN, and thus, first place importance on the arrangement position.

Next, it is checked whether or not the transfer destination is in operation, and it is checked whether or not the processing usage rate is acceptable from among the user plane functions of the LAN in operation. At this time, in a case where there is no target user plane function, it is checked whether or not transfer to the cloud is allowed, and in a case where the transfer is permitted, a user plane function having a low processing usage rate among the user plane functions in operation in the cloud is selected as the transfer destination.

Figure 13:
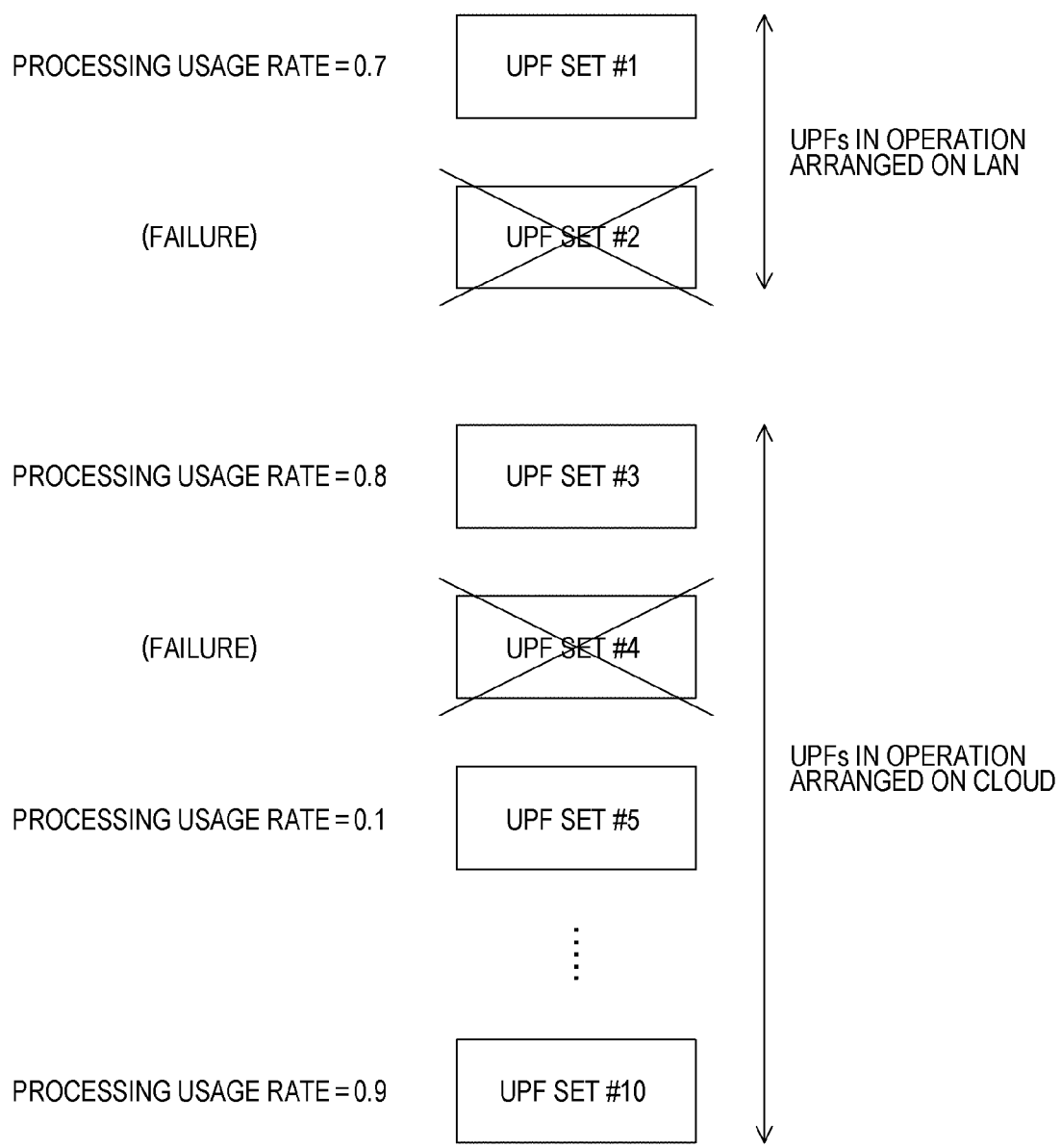
FIG. 13 is a diagram illustrating a second state example of user plane functions according to the embodiment of the present technology.

FIG. 13 is a diagram illustrating a second state example of user plane functions according to the embodiment of the present technology.

In this example, it is assumed that the user plane functions #1 and #2 are arranged on a LAN, and eight user plane functions #3 to #10 are arranged and operated on a cloud. Here, in a case where a failure is detected in the user plane function #4 arranged on the cloud, the transfer destination is searched for from the user plane functions arranged on the cloud.

Meanwhile, in a case where a failure is detected in the user plane function #2 arranged on the LAN, the transfer destination is basically searched for from the user plane functions arranged on the LAN, but in a case where there is no appropriate user plane function, the transfer destination is searched for from the user plane functions arranged in the cloud. For example, as in this example, in a case where the processing usage rate of the user plane function #1 is as high as "0.7" and there is no user plane function with a processing usage rate of "0.3" or less, such transfer to the cloud is also possible as long as it indicates that the transfer to the cloud is permitted.

[Operation]

Figure 14:
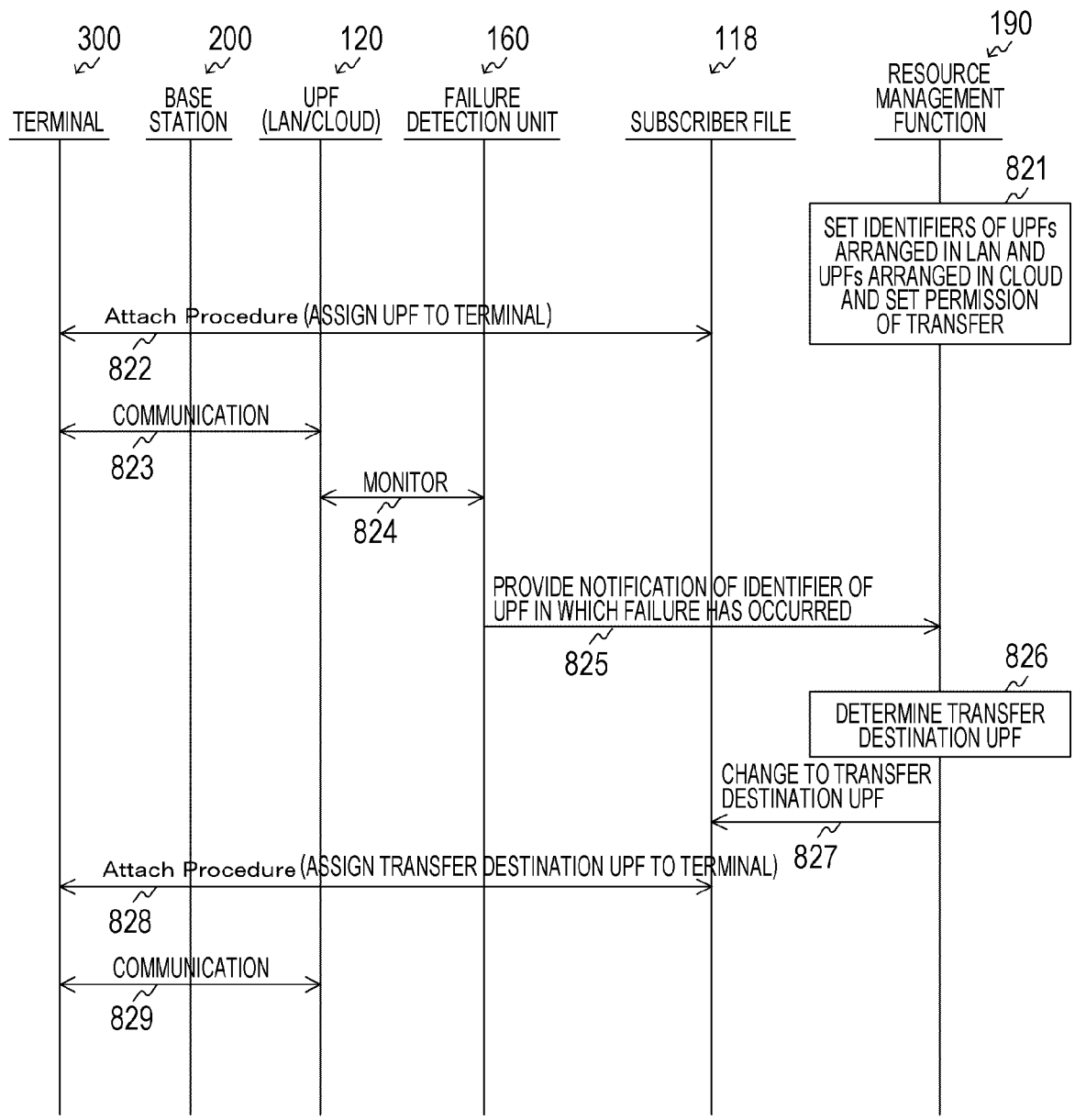
FIG. 14 is a sequence diagram illustrating an example of a processing flow of the communication system according to the second embodiment of the present technology.

FIG. 14 is a sequence diagram illustrating an example of a processing flow of the communication system according to the second embodiment of the present technology.

In this example, the identifiers of the user plane functions arranged in the LAN and the identifiers of the user plane functions arranged in the cloud are set in advance (821). Furthermore, information as to whether or not transfer from the LAN to the cloud is permitted when a failure occurs is set in advance (821).

The subsequent procedure is basically similar to that of the first embodiment described above. However, when the resource management function 190 that has received the notification from the failure detection unit 160 determines the user plane function as the transfer destination (826), transfer to a user plane function arranged on the cloud is performed when a failure occurs in a user plane function arranged on the cloud.

Furthermore, when a failure occurs in a user plane function arranged on the LAN, transfer is performed to a user plane function arranged on the LAN as much as possible. However, in a case where there is no appropriate user plane function when a failure occurs in a user plane function arranged on the LAN, transfer is performed to a user plane function arranged on the cloud if the setting to permit transfer to the cloud is made.

[First Modification]

FIG. 15 is a diagram illustrating a fifth example of states of user plane functions grasped by the resource management function 190 according to the embodiment of the present technology.

In this example, for each of 32 user plane functions (UPFs), information regarding computer performance for accommodating user plane functions is illustrated in addition to the arrangement position, state, and processing usage rate.

For example, in a case where there is an application that requires a very low latency, it is considered that a user plane function that accommodates a terminal having such an application is assigned a high-specification virtual machine for running the program of the user plane function. Here, as the specification (performance), a processor speed, a memory, an Ethernet speed, and the like are assumed.

In the cloud, such a virtual machine with high specifications can be expensive per unit time. Therefore, when a failure occurs in a user plane function with high specifications, it is conceivable to perform transfer to a user plane function having equivalent performance. Therefore, as illustrated in the drawing, the resource management function 190 holds in advance information regarding computer performance for accommodating the user plane function.

[Second Modification]

FIG. 16 is a diagram illustrating a sixth example of states of user plane functions grasped by the resource management function 190 according to the embodiment of the present technology.

In this example, for each of 32 user plane functions (UPFs), information regarding the priority of performing recovery when a failure occurs is indicated in addition to the arrangement position, the state, and the processing usage rate.

When a failure occurs simultaneously in a plurality of user plane functions, it may not be possible to recover all the user plane functions at once (that is, transfer terminals). That is, it may be difficult to immediately find transfer destination user plane functions for a plurality of user plane functions where failure has occurred. In a case where the transfer destinations are insufficient, it is necessary to take measures such as newly launching a virtual machine and launching a user plane function or the like. As a problem in that case, some applications using communication include remote medical care, remote control of a drone, or the like that need to be recovered as soon as possible. When a failure occurs, it is necessary to preferentially find the transfer destination of the user plane function used by such an important application. This is because the transfer to a newly launched virtual machine takes too much time.

Therefore, it is practically important for the system operator to set in advance which user plane function is preferentially recovered. Therefore, as illustrated in the drawing, the resource management function 190 holds in advance information regarding the priority of recovery when a failure occurs. Therefore, when failures of a plurality of user plane functions occur at the same time, the transfer destination of the user plane function with high priority is determined first when the user plane function of the transfer destination described above is determined (826).

A lower priority user plane function may not have an appropriate transfer destination at some point. At that time, it is considered that it is preferable to determine the transfer destination by checking again whether there is a user plane function with a low processing usage rate after a while. In a case where the transfer destination is not found even after a certain period of time has elapsed, a new user plane function may be launched.

Note that the priority illustrated here can be regarded as a priority in the LAN and a priority in the cloud. That is, a transfer destination of a user plane function arranged on the LAN is basically a user plane function arranged on the LAN, and a transfer destination of a user plane function arranged on the cloud is a user plane function arranged on the cloud. Therefore, the priority described above may be divided into the priority in the LAN and the priority in the cloud.

The setting of the recovery priority in this example may be manually set or automatically set. In the case of automatic operation, it is necessary to automatically detect which application is likely to be used by the terminal belonging to the user plane function. As the most realistic approach, when a terminal is associated with a user plane function, a terminal that is likely to use an important application is preferably associated with a user plane function having a high recovery priority. That is, it is conceivable to automatically allocate a user plane function with high priority to a terminal corresponding to an application of the terminal.

As described above, in the second embodiment of the present technology, when a failure occurs in a user plane function arranged on the cloud, the transfer is performed to a user plane function arranged on the cloud, and when a failure occurs in a user plane function arranged on the LAN, the transfer is performed to a user plane function arranged on the LAN as much as possible. Therefore, the service level after the transfer can be maintained in a similar manner to before the transfer. Furthermore, considering the priority of recovery can minimize service interruption of important applications.

3. Third Embodiment

In the third embodiment, a mechanism for efficiently performing failure detection in a case where user plane functions are arranged in both a LAN and a cloud will be examined. Specifically, each arrangement will be examined on the assumption of a failure detection initiator that starts detection of a failure and a failure detection responder that detects a failure in response to the start of detection of a failure from the failure detection initiator.

Figure 17:
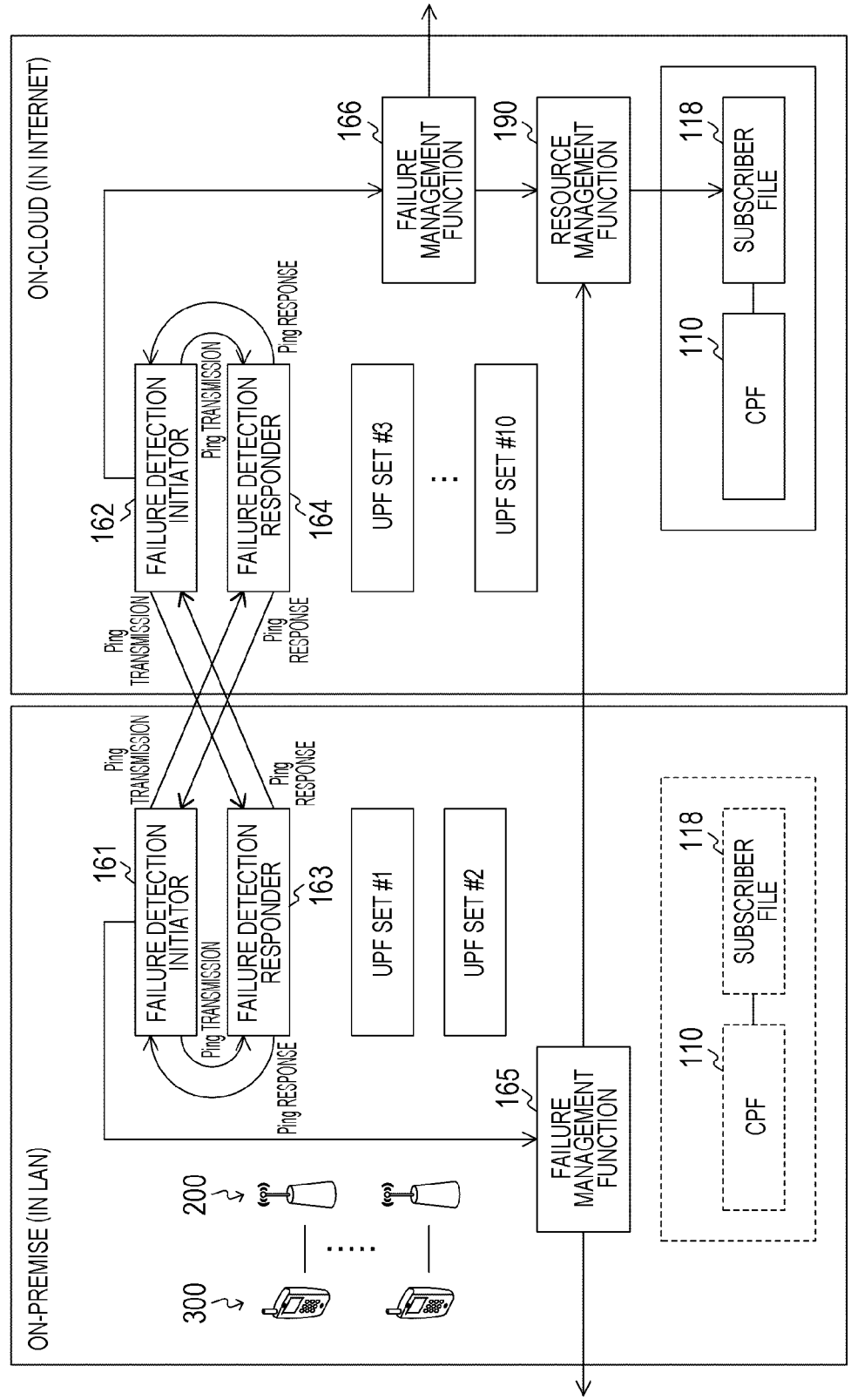
FIG. 17 is a diagram illustrating a configuration example for failure detection according to the third embodiment of the present technology.

FIG. 17 is a diagram illustrating a configuration example for failure detection according to the third embodiment of the present technology.

In this example, it is assumed that two user plane functions #1 and #2 are arranged on a LAN, and eight user plane functions #3 to #10 are arranged and operated on a cloud. Then, on the LAN side, one failure detection initiator 161 and a failure detection responder 163 for each user plane function are arranged. Furthermore, on the cloud side, one failure detection initiator 162 and a failure detection responder 164 for each user plane function are arranged.

Furthermore, failure management functions 165 and 166 that forward an alarm when a failure occurs are arranged on the LAN side and the cloud side, respectively. A resource management function 190 is arranged on the cloud side.

The failure detection initiator 161 on the LAN side transmits a ping to the plurality of failure detection responders 163 on the LAN side at regular intervals (for example, 10 minutes), and receives a ping response from the failure detection responders 163 to confirm that each user plane function is operating. A user plane function that does not return the ping response recognizes that a failure has occurred, and forwards the alarm to the failure management function 165 arranged on the LAN side. The failure management function 165 notifies the resource management function 190 arranged in the cloud of which user plane function has a failure.

For example, the resource management function 190 grasps that the UPF numbers #1 to #2 are used in the LAN, and grasps that the user plane functions #3 to #10 are used in the cloud. Therefore, in a case where a failure of the user plane function with the UPF number #2 is reported, the resource management function 190 makes a determination to transfer the user plane function to another user plane function (#1 or the like) on the LAN side. The resource management function 190 performs transfer of the user plane function by rewriting the subscriber file used by the control plane function of the core network.

The failure detection initiator 161 on the LAN side transmits ping to the plurality of failure detection responders 164 on the cloud side at regular intervals (for example, 10 minutes), and recognizes that a failure such as disconnection or the like has occurred in the Internet line between the LAN and the cloud in a case where no ping response is returned from any of the failure detection responders 164. In this case, an alarm indicating that the LAN is isolated is forwarded to the failure management function 165 arranged on the LAN side.

The failure management function 165 can notify the administrator of the private 5G/4G of the fact by e-mail or the like. The private 5G/4G administrator who receives the notification can also activate a control plane function program of the core network in the LAN and close in the LAN to restore the cellular system. Note that the manual restoration may be automatic.

The cloud side failure detection initiator 162 transmits a ping to the plurality of cloud side failure detection responders 164 at regular intervals (for example, 10 minutes), and receives a ping response from the failure detection responders 164, thereby confirming that each user plane function is operating. For the user plane function to which the ping response is not returned, it is recognized that a failure has occurred, and the alarm is forwarded to the failure management function 166 arranged on the cloud side. The failure management function 166 notifies the resource management function 190 arranged in the cloud of which user plane function has a failure.

For example, the resource management function 190 grasps that the user plane functions #1 and #2 are used in the LAN, and grasps that the user plane functions #3 to #10 are used in the cloud. Therefore, in a case where a failure of the user plane function with the UPF number #3 is reported, the resource management function 190 makes a determination to transfer the user plane function to another user plane function (#7 or the like) on the cloud side. The resource management function 190 performs transfer of the user plane function by rewriting the subscriber file 118 used by the control plane function of the core network.

The failure detection initiator 162 on the cloud side transmits ping to the plurality of failure detection responders 163 on the LAN side at regular intervals (for example, 10 minutes), and recognizes that a failure such as disconnection or the like has occurred in the Internet line between the LAN and the cloud in a case where no ping response is returned from any of the failure detection responders 163. In this case, an alarm indicating that the LAN is isolated may be issued. The alarm may be forwarded to an administrator of the private 5G/4G by e-mail.

In the above-described operation, the main role is on the cloud side, and the resource management function 190 is arranged only on the cloud side. Furthermore, normally, the control plane function of the core network is disposed only on the cloud side, and operates as both the user plane function disposed on the LAN side and the user plane function disposed on the cloud side. However, in a case where the LAN is disconnected from the Internet, the control plane function on the LAN side may be used by an administrator of the private 5G/4G.

The acquired failure alarms are collected by the LAN side or the cloud side failure management function 165 or 166, and ultimately forwarded to the resource management function 190 on the cloud side. With such a configuration, integration of failure detection statuses on both the LAN side and the cloud side is completed on each network side (LAN or cloud). Therefore, it is possible to forward the alarm to the network operator before transferring the user plane function to the resource management function 190.

Note that the failure detection initiators 161 and 162, the failure detection responders 163 and 164, and the failure management functions 165 and 166 constitute the failure detection unit 160 described above, and are an example of a failure detection unit described in the claims.

Figure 18:
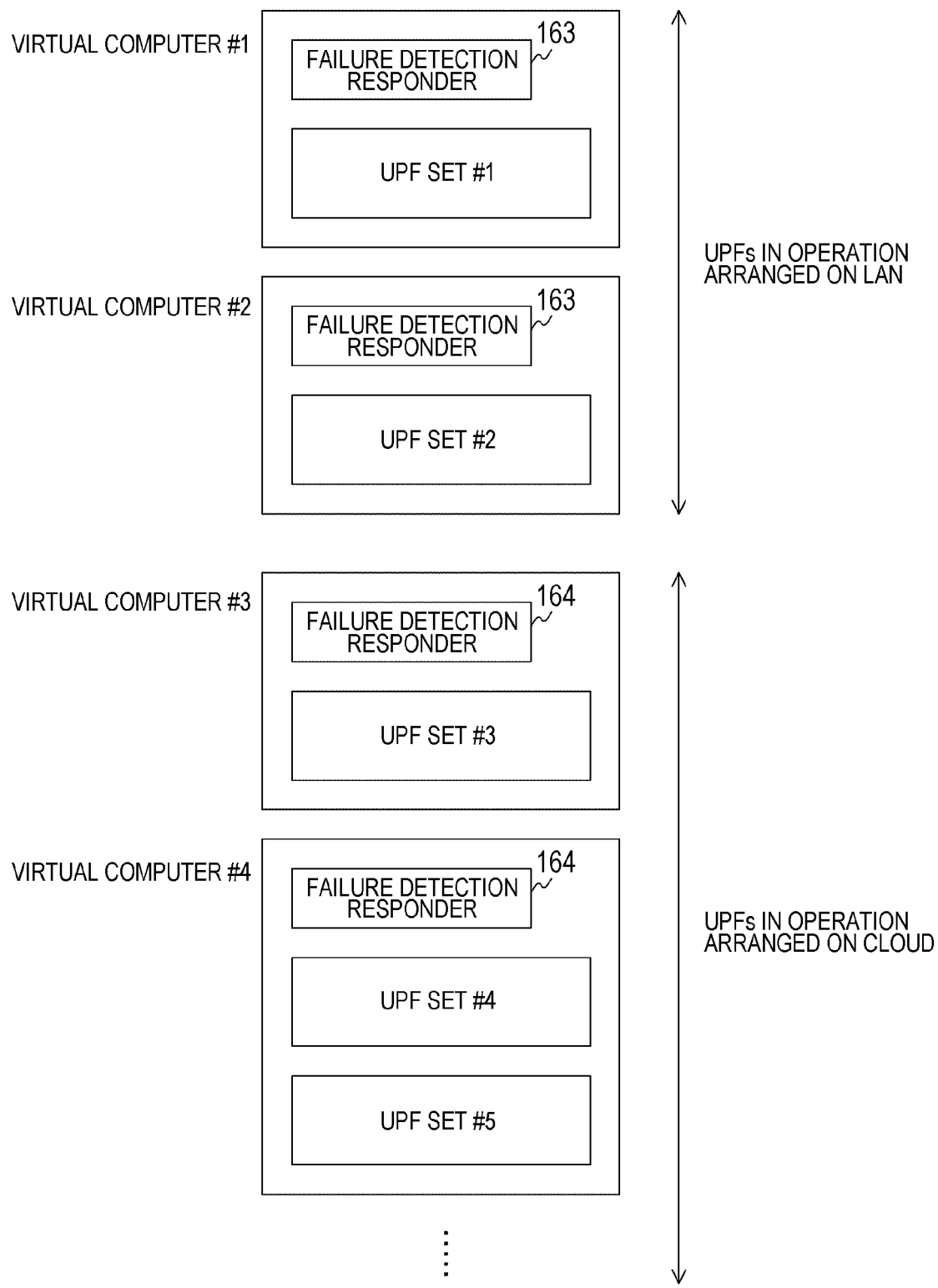
FIG. 18 is a diagram illustrating an arrangement example of failure detection responders 163 and 164 according to the third embodiment of the present technology.

FIG. 18 is a diagram illustrating an arrangement example of the failure detection responders 163 and 164 according to the third embodiment of the present technology.

The failure detection responders 163 and 164 are present for each user plane function. A program for making a ping response is arranged in a real computer or a virtual machine (virtual computer) in which the program of each user plane function is executed and operated. In a case where a plurality of user plane functions is arranged in one real computer or virtual machine, a common failure detection responder 163 or 164 is used for the plurality of user plane functions. This is because most of failures of user plane functions are failures of a computer on which user plane functions are installed, and it is sufficient to detect a failure in units of computers.

[Operation]

Figure 19:
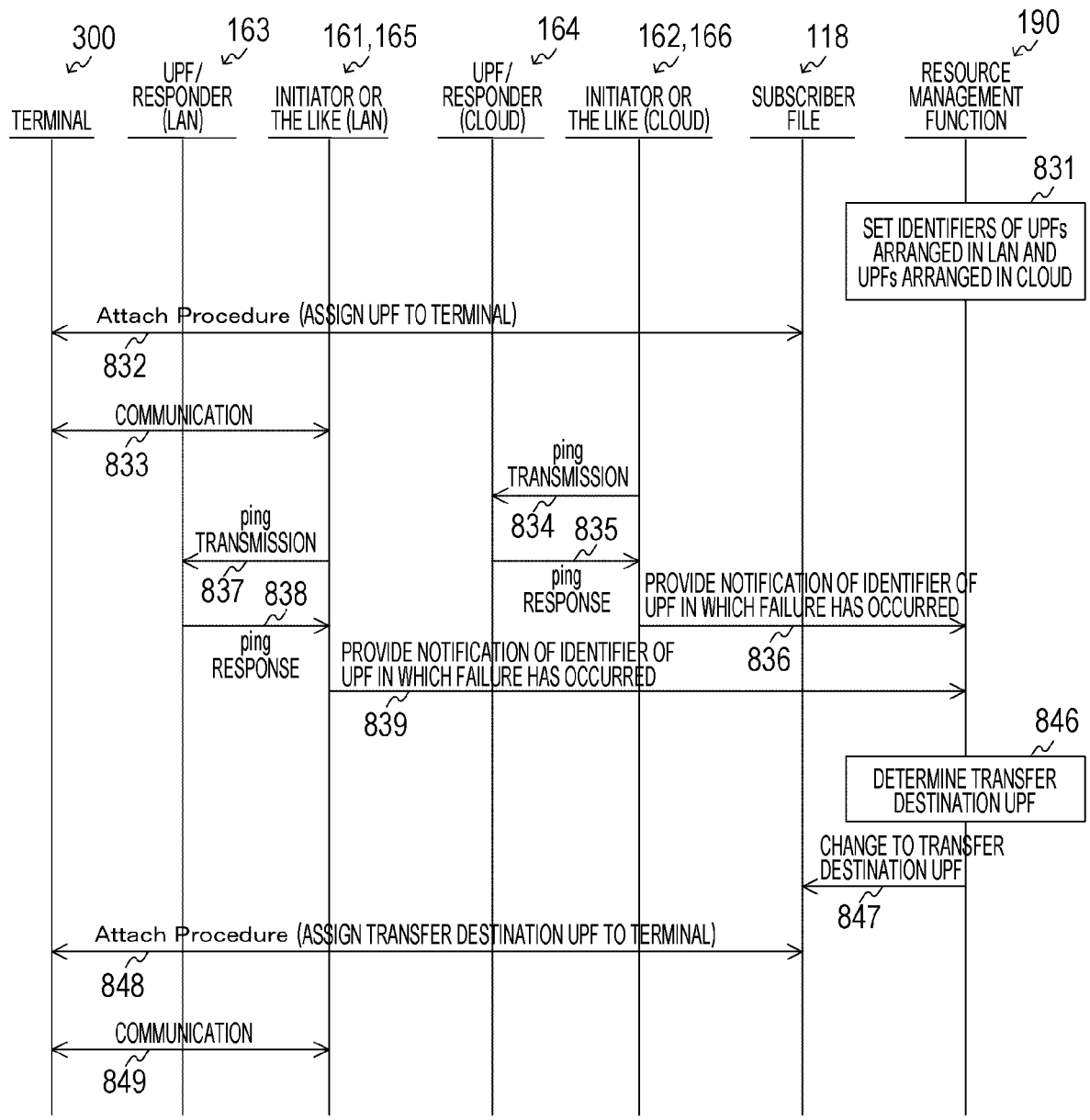
FIG. 19 is a sequence diagram illustrating a first example of a processing flow of the communication system according to the third embodiment of the present technology.

FIG. 19 is a sequence diagram illustrating a first example of a processing flow of the communication system according to the third embodiment of the present technology.

In this example, the identifiers of the user plane functions arranged in the LAN and the identifiers of the user plane functions arranged in the cloud are set in advance (831).

When the terminal 300 is powered on, an attach procedure operates, and the control plane function 110 assigns the user plane function 120 to the terminal 300 in accordance with the subscriber information in the subscriber file 118 (832). Therefore, the terminal 300 performs communication using the assigned user plane function 120 (833).

The failure detection initiator 162 on the cloud side performs monitoring for failure detection by transmitting ping to a plurality of failure detection responders 164 on the cloud side at regular intervals (834) and receiving ping responses (835) from the failure detection responders 164. The user plane function that does not return the ping response recognizes that a failure has occurred, and forwards the alarm to the failure management function 166 arranged on the cloud side. Therefore, the failure management function 166 notifies the resource management function 190 of the identifier of the user plane function in which the failure has occurred (836).

The failure detection initiator 161 on the LAN side performs monitoring for failure detection by transmitting ping to the plurality of failure detection responders 163 on the LAN side at regular intervals (837) and receiving ping responses (838) from the failure detection responders 163. A user plane function that does not return the ping response recognizes that a failure has occurred, and forwards the alarm to the failure management function 165 arranged on the LAN side. Therefore, the failure management function 165 notifies the resource management function 190 of the identifier of the user plane function in which the failure has occurred (839).

Upon receiving the notification from the failure management function 165 or 166, the resource management function 190 determines a user plane function as a transfer destination (846). Then, the resource management function 190 changes the subscriber information of the subscriber file 118 so as to associate the transfer destination user plane function with the terminal 300 instead of the user plane function where the failure has occurred (847).

Thereafter, the power supply of the terminal 300 is temporarily turned off and turned on again, so that the attach procedure operates again (848). Therefore, the transfer destination user plane function 120 is assigned to the terminal 300 on the basis of the subscriber information of the subscriber file 118. Thereafter, the terminal 300 performs communication using the newly assigned user plane function 120 (849).

Figure 20:
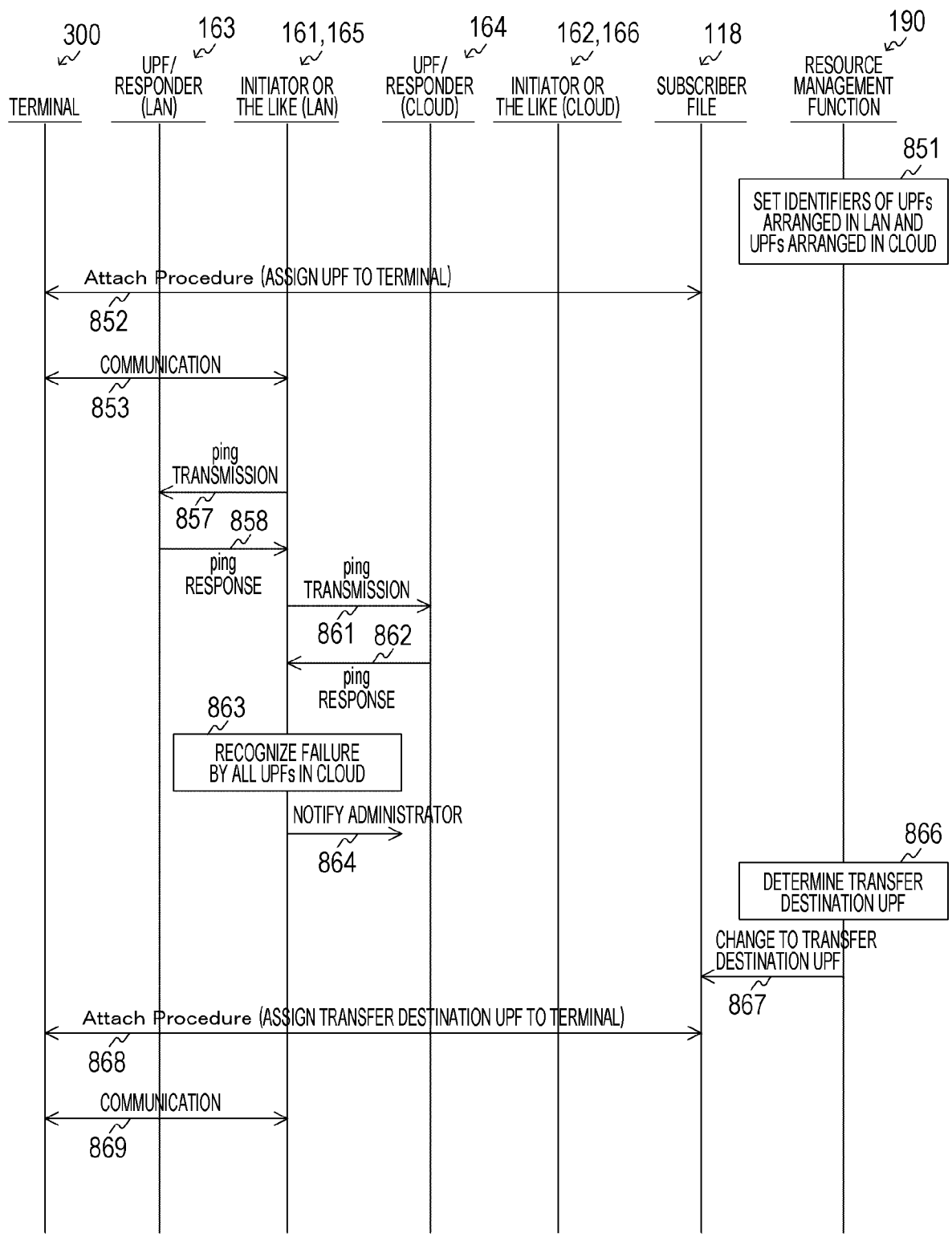
FIG. 20 is a sequence diagram illustrating a second example of a processing flow of the communication system according to the third embodiment of the present technology.

FIG. 20 is a sequence diagram illustrating a second example of a processing flow of the communication system according to the third embodiment of the present technology.

In this example, the failure detection initiator 161 on the LAN side transmits ping to the plurality of failure detection responders 163 on the LAN side (857) and receives ping responses (858) to monitor the occurrence of a failure, and also transmits ping to the plurality of failure detection responders 164 on the cloud side (861) and receives ping responses (862).

As a result, in a case where a ping response is not returned from any of the failure detection responders 164, it is recognized that a failure such as disconnection or the like has occurred in the Internet line between the LAN and the cloud (863). Then, an alarm indicating that the LAN is isolated is forwarded to the failure management function 165 arranged on the LAN side. The failure management function 165 notifies the administrator of the private 5G/4G of the fact by e-mail or the like (864).

[Modification]

In the above example, the case of transmitting ping for failure detection has been described as an example. According to ping, it is possible to determine whether or not the network interface of the computer is operating. Similarly to ping, as a method of checking whether or not the computer is operating, it is conceivable to establish a communication connection such as a TCP Keep Alive or an HTTP Keep Alive between the failure detection initiators 161 and 162 and the failure detection responders 163 and 164, and to confirm whether the connection of the communication is alive by periodically transmitting a packet for the keep-alive. In this case, the user plane function side transmits the packet of the keep-alive and the failure detection initiator 161 and 162 side collects the packet.

In the method using ping or keep-alive, the computer and the network function, but it is not possible to detect that the installed software stops operating. Therefore, in order to confirm whether or not the software of the user plane function is actually operating, a mechanism for periodically outputting a message indicating that the software of the user plane function is operating to a log file may be installed in the program of the user plane function. The arrangement position of the log file may be in the file system of the computer in which the user plane function is operating. By periodically reading the log file from a remote place and confirming the contents, it is possible to confirm that the user plane function program is actually operating.

Furthermore, as another method, a message of heartbeat may be periodically exchanged between a process in which the user plane function program is operating and a process in which the programs of the failure detection initiators 161 and 162 are operating to monitor whether the other party is operating.

As described above, in the third embodiment of the present technology, failure detection can be efficiently performed by using the failure detection initiators 161 and 162 and the failure detection responders 163 and 164. That is, since recovery from a network failure can be performed at low cost, a stable communication environment can be provided to the user.

Note that the above-described embodiments illustrate examples for embodying the present technology, and the matters in the embodiments and the invention specifying matters in the claims have a correspondence relationship. Similarly, the matters specifying the invention in the claims and the matters in the embodiments of the present technology denoted by the same names as the matters specifying the invention have a correspondence relationship. However, the present technology is not limited to the embodiments, and can be embodied by making various modifications to the embodiments without departing from the gist thereof.

Furthermore, the processing procedure described in the above-described embodiments may be regarded as a method including these series of procedures, and may be regarded as a program for causing a computer to execute these series of procedures or a recording medium storing the program. As this recording medium, for example, a compact disc (CD), a MiniDisc (MD), a digital versatile disc (DVD), a memory card, a Blu-ray (registered trademark) disc, or the like can be used.

Note that the effects described in the present specification are merely examples and are not limited, and other effects may be provided.

Note that the present technology can also have the following configurations.

(1) A communication system including:
  a subscriber information holding unit that holds subscriber information indicating association between a terminal and a user plane function in a communication system;
  a failure detection unit that detects a failure related to the user plane function; and
  a control unit that changes the subscriber information to associate a new user plane function with the terminal associated with the user plane function in which the failure is detected.

(2) The communication system according to (1),
  in which the control unit selects, as the new user plane function, a user plane function with a low processing usage rate among user plane functions in operation.

(3) The communication system according to (2),
  in which the processing usage rate is determined on the basis of a traffic amount of the user plane function in operation.

(4) The communication system according to (2),
  in which the processing usage rate is determined on the basis of the number of terminals associated with the user plane function in operation.

(5) The communication system according to any one of (1) to (4),
  in which in a case where the user plane function in which the failure is detected is arranged in a cloud, the control unit selects another user plane function in operation arranged in the cloud as the new user plane function, and in a case where the user plane function in which the failure is detected is arranged in a local area network, the control unit selects another user plane function in operation arranged in the local area network as the new user plane function.

(6) The communication system according to (5),
  in which in a case where the user plane function in which the failure is detected is arranged in the local area network, if there is no user plane function that satisfies a predetermined criterion among other user plane functions in operation arranged in the local area network, the control unit selects another user plane function in operation arranged in the cloud as the new user plane function.

(7) The communication system according to (6),
  in which the control unit manages, for each user plane function, permission information as to whether or not to permit selection of another user plane function in operation arranged in the cloud as the new user plane function in a case where the user plane function in which the failure is detected is arranged in the local area network, and selects another user plane function in operation arranged in the cloud as the new user plane function only in a case where the permission information of the user plane function in which the failure is detected indicates permission.

(8) The communication system according to any one of (1) to (7),
  in which the control unit associates a plurality of the new user plane functions with the terminal associated with the user plane function in which the failure is detected.

(9) The communication system according to any one of (1) to (8),
  in which the control unit manages, as computer performance information, performance of a computer storing a user plane function in operation for each user plane function, and selects the new user plane function on the basis of the computer performance information.

(10) The communication system according to any one of (1) to (9),
in which the control unit manages priority information of user plane functions in operation for each user plane function, and selects the new user plane function on the basis of the priority information.

(11) The communication system according to any one of (1) to (10),
in which the failure detection unit is disposed in both a cloud and a local area network.

(12) The communication system according to (11),
in which the failure detection unit arranged in the cloud collects the failure for both the cloud and the local area network, and notifies the control unit arranged in the cloud of the failure detected.

(13) The communication system according to (11) or (12),
in which in a case where the failure detection unit arranged in the cloud detects the failure for all user plane functions arranged in the local area network, the failure detection unit notifies the control unit arranged in the cloud of disconnection as communication between the local area network and the cloud is disconnected.

(14) The communication system according to any one of (1) to (13),
in which the failure detection unit includes:
a failure detection initiator that starts detection of the failure; and
a failure detection responder provided for each user plane function to detect the failure in response to start of the detection of the failure.

(15) A failure recovery method in a communication system including:
a subscriber information holding unit that holds subscriber information indicating association between a terminal and a user plane function in the communication system, the method including:
a procedure in which a failure detection unit detects a failure related to the user plane function; and
a procedure in which a control unit changes the subscriber information to associate a new user plane function with the terminal associated with the user plane function in which the failure is detected.

REFERENCE SIGNS LIST

110 Control plane function (CPF)
118 Subscriber file
120 User plane function (UPF)
160 Failure detection unit
161, 162 Failure detection initiator
163, 164 Failure detection responder
165, 166 Failure management function
190 Resource management function
200 Base station
300 Terminal
410 Router

The invention claimed is:
1. A communication system, comprising:
a subscriber information holding unit is configured to hold subscriber information that indicates an association between a terminal and a first user plane function of a plurality of user plane functions in operation in the communication system;
a failure detection unit is configured to detect a failure related to the first user plane function; and
a control unit is configured to:
change the subscriber information to associate a new user plane function with the terminal associated with the first user plane function in which the failure is detected;
select, based on the first user plane function in which the failure is detected is in a cloud, a second user plane function of the plurality of user plane functions as the new user plane function; and
select, based on the first user plane function in which the failure is detected is in a local area network, a third user plane function of the plurality of user plane functions as the new user plane function.

2. The communication system according to claim 1, wherein
the control unit is further configured to select, as the new user plane function, a fourth user plane function of the plurality of user plane functions, and
a processing usage rate of the fourth user plane function is lowest among the plurality of user plane functions in operation.

3. The communication system according to claim 2, wherein the processing usage rate is based on a traffic amount of the fourth user plane function in operation.

4. The communication system according to claim 2, wherein the processing usage rate is further based on a count of terminals associated with the second user plane function in operation.

5. The communication system according to claim 1, wherein based on the first user plane function in which the failure is detected is in the local area network and no user plane function that satisfies a specific criterion among the plurality of user plane functions in operation in the local area network, the control unit is further configured to select a fourth user plane function of the plurality of user plane functions.

6. The communication system according to claim 5, wherein the control unit is further configured to:
manage, for each user plane function of the plurality of user plane functions, permission information based on a permission to select the fourth user plane function as the new user plane function; and
select the fourth user plane function as the new user plane function based on the permission information of the first user plane function in which the failure is detected.

7. The communication system according to claim 1, wherein
the control unit is further configured to associate a set of user plane functions of the plurality of user plane functions with the terminal associated with the first user plane function in which the failure is detected, and
the set of user plane functions is different from the first user plane function.

8. The communication system according to claim 1, wherein the control unit is further configured to:
manage, as computer performance information, performance of a computer for each user plane function of the plurality of user plane functions, wherein the computer stores the new user plane function in operation; and
select the new user plane function based on the computer performance information.

9. The communication system according to claim 1, wherein the control unit is further configured to:

manage, for each user plane function of the plurality of user plane functions, priority information of the plurality of user plane functions in operation for each user plane function; and select the new user plane function based on the priority information.

10. The communication system according to claim 1, wherein the failure detection unit is in both the cloud and the local area network.

11. The communication system according to claim 10, wherein the failure detection unit, in the cloud, is further configured to:

collect the failure for both the cloud and the local area network; and notify the control unit, in the cloud, of the detected failure.

12. The communication system according to claim 10, wherein based on the failure detection unit is in the cloud, the failure detection unit is further configured to:

detect the failure for each of a set of user plane functions of the plurality of user plane functions, wherein the set of user plane functions is in the local area network; and notify the control unit, the cloud, of disconnection as communication between the local area network and the cloud is disconnected.

13. The communication system according to claim 1, wherein the failure detection unit includes:

a failure detection initiator configured to start the detection of the failure; and a failure detection responder, for each user plane function of the plurality of user plane functions, to detect the failure in response to start of the detection of the failure.

14. A failure recovery method, comprising:

in a communication system:

holding subscriber information indicating association between a terminal and a first user plane function of a plurality of user plane functions in operation in the communication system;

detecting a failure related to the first user plane function;

changing the subscriber information to associate a new user plane function with the terminal associated with the first user plane function in which the failure is detected;

selecting, based on the first user plane function in which the failure is detected is in a cloud, a second user plane function of the plurality of user plane functions as the new user plane function; and selecting, based on the first user plane function in which the failure is detected is in a local area network, a third user plane function of the plurality of user plane functions as the new user plane function.

* * * * *